US012768324B2

(12) United States Patent
Niethammer

(10) Patent No.: US 12,768,324 B2
(45) Date of Patent: Oct. 20, 2026

(54) INJECTOR FOR BLOWING A GAS INTO A COMBUSTION CHAMBER OR INTO AN INTAKE MANIFOLD OF A MOTOR VEHICLE

(71) Applicant: Bernd Niethammer, Königsfeld (DE)

(72) Inventor: Bernd Niethammer, Königsfeld (DE)

( * ) Notice: Subject to any disclaimer, the term of this patent is extended or adjusted under 35 U.S.C. 154(b) by 359 days.

(21) Appl. No.: 18/273,765

(22) PCT Filed: Feb. 1, 2022

(86) PCT No.: PCT/EP2022/000012
§ 371 (c)(1),
(2) Date: Oct. 23, 2023

(87) PCT Pub. No.: WO2022/167145
PCT Pub. Date: Aug. 11, 2022

(65) Prior Publication Data

US 2024/0102436 A1 Mar. 28, 2024

(30) Foreign Application Priority Data

Feb. 2, 2021 (DE) ..................... 10 2021 000 617.8

(51) Int. Cl.

| | |
|---|---|
| ***F02M 47/02*** | (2006.01) |
| ***F02M 51/06*** | (2006.01) |
| ***F02M 61/12*** | (2006.01) |
| ***F02M 61/16*** | (2006.01) |

(52) U.S. Cl.
CPC ...... *F02M 47/027* (2013.01); *F02M 51/0603* (2013.01); *F02M 61/12* (2013.01); *F02M 61/168* (2013.01)

(58) Field of Classification Search
CPC .. F02M 61/12; F02M 61/168; F02M 51/0603; F02M 47/027; F02M 21/0269; F02M 2200/703; F03M 43/04
See application file for complete search history.

(56) References Cited

U.S. PATENT DOCUMENTS

| | | | | |
|---|---|---|---|---|
| 4,687,136 | A | 8/1987 | Ozu et al. | |
| 5,996,558 | A | 12/1999 | Ouellette et al. | |
| 2002/0179730 | A1 | 12/2002 | Boecking | |
| 2009/0020631 | A1* | 1/2009 | Mashida | F02D 19/0694 239/533.3 |

(Continued)

FOREIGN PATENT DOCUMENTS

| | | | |
|---|---|---|---|
| CN | 110005557 | A | 7/2019 |
| DE | 102015010995 | A1 | 3/2016 |

(Continued)

*Primary Examiner* — Christopher R Dandridge
(74) *Attorney, Agent, or Firm* — Smartpat PLC

(57) ABSTRACT

An injector has an injector needle (2) by means of which an outlet opening (4) of an injector housing (1) can be closed. The injector needle (2) can be adjusted in pressure-controlled fashion from a closed position into an open position. The injector needle (2) is axially fixedly connected to a piston (26) which is under closing pressure in one direction so that the injector needle (2) closes the outlet opening (4). In the other direction, the piston (26) and thus the injector needle (2) can be displaced by a valve-controlled control pressure, whereby the injector needle (2) passes into its open position and releases the outlet opening (4).

20 Claims, 27 Drawing Sheets

(56) References Cited

U.S. PATENT DOCUMENTS

| | | | |
|---|---|---|---|
| 2009/0302136 A1 | 12/2009 | Song | |
| 2013/0255637 A1 | 10/2013 | Noh et al. | |
| 2016/0053734 A1 | 2/2016 | Schuele et al. | |
| 2021/0381477 A1* | 12/2021 | Lee | F02M 55/002 |

FOREIGN PATENT DOCUMENTS

| | | | | | |
|---|---|---|---|---|---|
| DE | 102018211416 | A1 | | 1/2020 | |
| EP | 0980475 | A1 | | 2/2000 | |
| EP | 3296557 | A1 | | 3/2018 | |
| FR | 1321539 | | * | 3/1963 | F01L 9/11 |
| FR | 1321539 | A | | 3/1963 | |
| JP | 2009243410 | A | | 10/2009 | |
| JP | 2012225201 | A | | 11/2012 | |
| WO | WO-9720136 | A1 | * | 6/1997 | F02D 41/24 |
| WO | WO-03006821 | A1 | * | 1/2003 | F02M 61/166 |

* cited by examiner

INJECTOR FOR BLOWING A GAS INTO A COMBUSTION CHAMBER OR INTO AN INTAKE MANIFOLD OF A MOTOR VEHICLE

CROSS-REFERENCE TO RELATED APPLICATION

This application is a national stage application, filed under 35 U.S.C. § 371, of International Patent Application PCT/EP2022/000012, filed on Feb. 1, 2022, which claims the benefit of German Patent Application DE 10 2021 000 617.8, filed on Feb. 2, 2021.

TECHNICAL FIELD

The invention relates to an injector for blowing a gas into a combustion chamber or into an intake manifold of a motor vehicle.

BACKGROUND

Gasoline injectors that are used for gas injection are known. Gas injectors for blowing in with an intake manifold are also known. The injectors are usually controlled directly with the aid of an electromagnet. The introduction of the required amount of fuel is specified by an engine map and by pressure and temperature.

Such directly actuated gas injectors have defined cross-sections at the sealing seat of the nozzle, which are to be designed depending on the achievable magnetic force and the seat diameter. The magnetic forces are usually bounded by the available current and voltages in the vehicles along with the necessary dynamics of the injectors. Low masses are required for very rapid switching movements. In order to get the necessary quantities of hydrogen into the combustion chamber, large opening cross-sections are required. This is only possible with larger magnets with correspondingly high forces, especially if the pressures of the gas are higher.

SUMMARY

The invention is based on the object of designing the generic injector in such a manner that the gas can be ejected through the nozzle to a sufficient extent even during very rapid switching movements.

This object is achieved in the injector as claimed.

With the injector, the injector needle is actuated indirectly. It is axially fixedly connected to the piston, which is under closing pressure in one direction, so that the injector needle closes the outlet opening. In the other direction, the piston and thus the injector needle can be displaced by a valve-controlled control pressure, causing the injector needle to pass into its open position and release the outlet opening. In this manner, the piston with the injector needle can reach the respective positions within a very short time, such that very rapid switching movements can be carried out with the injector. The switching times are usually in the microsecond to millisecond range.

With an advantageous design, a first valve, which can be actuated by an actuator, is connected upstream of the piston for generating the control pressure. The valve enables very rapid switching times.

The actuator is preferably provided with a valve actuating piston, which cooperates with the first valve. The valve actuating piston is adjusted by the actuator if a blowing-in process is to take place. The valve actuating piston then actuates the first valve such that the control pressure acts on the piston and thus the injector needle, with which the injector needle is displaced to the open position.

In a particularly advantageous embodiment, a further valve is assigned to the first valve. The two valves are switched in opposite directions; i.e., when the first valve is open, the further valve is closed and when the first valve is closed, the further valve is open. In this manner, the control pressure exerted on the piston can be built up within a short time by adjusting the two valves accordingly.

Thereby, it is advantageous if, when the first valve is actuated by the valve actuating piston, the further valve is positively displaced into the other position.

The two valves take up very little installation space inside the injector housing, such that the injector can be built in a correspondingly compact manner.

The injector can be designed such that the injector needle assumes its closed position when the first valve is closed.

Thereby, it is advantageously possible for the first valve to be kept closed by the valve actuating piston of the actuator.

Advantageously, the further valve is flow-connected to a pressure chamber that is axially bounded by the piston. Therefore, if the further valve assumes its corresponding switching position, the pressure required to displace the piston can be built up in the pressure chamber. Such control pressure exerted on the piston is then higher than the closing pressure exerted on the piston, which is therefore displaced in the opposite direction to the closing pressure, such that the injector needle passes into its open position and the gas can thus escape from the nozzle opening.

With a first embodiment, the gas to be blown in can itself be used in order to generate the control pressure.

However, it is also possible to use a lower gas pressure from the system in addition to the gas to be blown in to generate the control pressure, or to use an additional control medium.

A particularly advantageous design is obtained if the injector housing is provided with at least one return line for a residual portion of the gas to be blown in. At least one check valve is located in such return line. It opens into the respective chamber into which the gas is to be blown. The check valve ensures that the gas from such chamber cannot flow back into the injector. The residual portion of the gas to be blown in can enter the combustion chamber or the intake manifold via the check valve, such that such residual portion does not have to be collected and compressed in a complicated manner in order to pump it back into the high-pressure tank.

Advantageously, a check valve can be inserted between the gas injector and the intake manifold to prevent pressure fluctuations in the intake manifold from reaching the gas injector.

The return line is advantageously line-connected to the pressure chamber with the first valve open, such that the residual portion of the gas to be blown in can flow through the check valve under corresponding pressure.

Advantageously, at least one bellows is used to seal the injector needle. The bellows is, for example, a metal bellows with which an at least virtually leak-free seal can be achieved.

In an advantageous embodiment, the valve actuating piston is designed as a hollow piston, into which a pressure medium can be introduced to act on the valve actuating piston.

The actuator is advantageously a magnetic drive, with which the valve actuating piston can be reliably displaced.

The magnetic drive is advantageously provided with a magnetic armature, which is axially fixedly connected seated on the valve actuating piston. Thereby, it can be easily displaced.

Further features of the invention are apparent from the further claims, the description and the drawings.

BRIEF DESCRIPTION OF THE DRAWINGS

The invention is explained in more detail with reference to some embodiments shown in the drawings.

DETAILED DESCRIPTION

Figure 1:
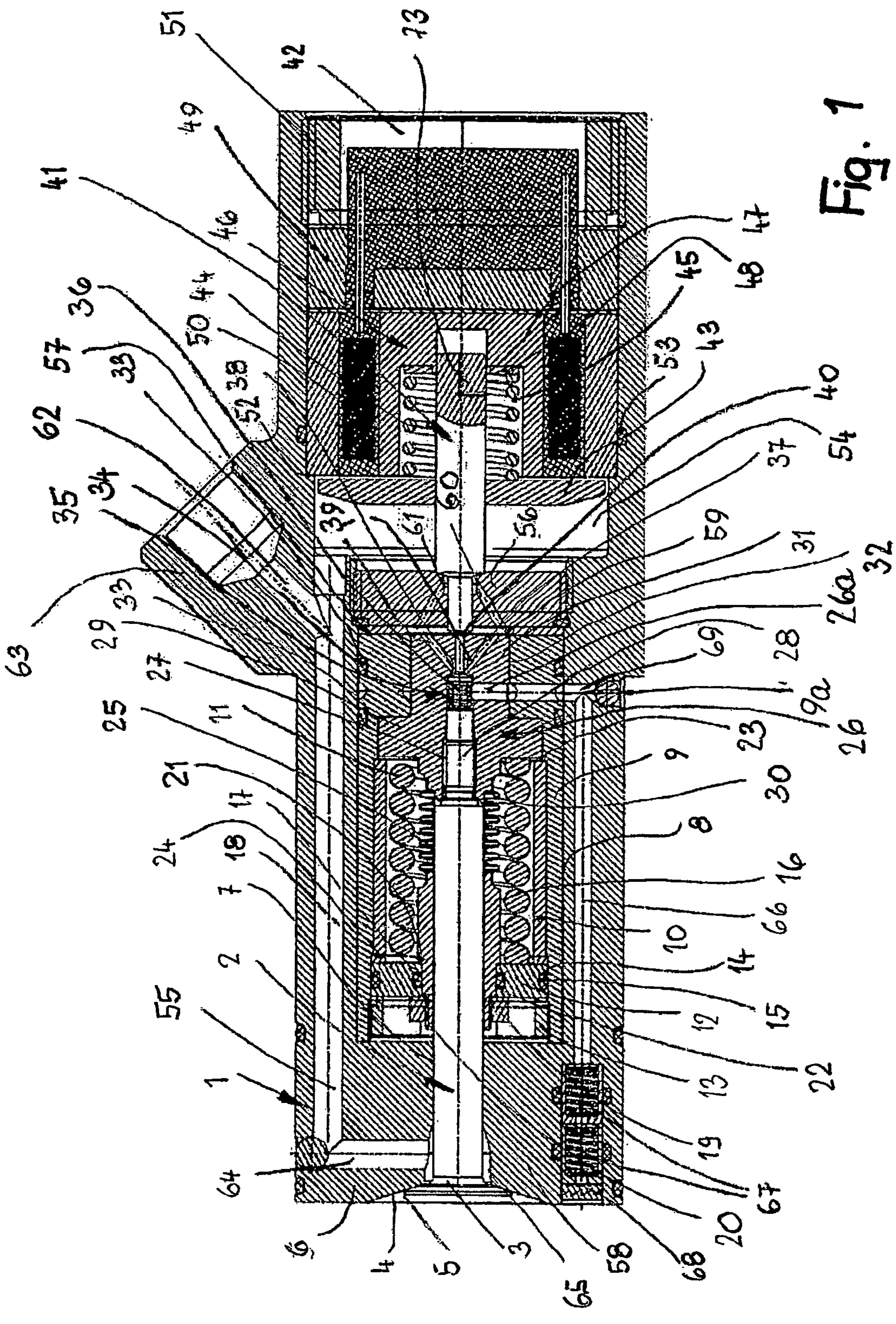
FIG. 1 shows, in an axial section, a first embodiment of a gas injector.

FIG. 1 shows a pilot-operated gas injector with recirculation of the gas into the combustion chamber of an internal combustion engine, preferably an internal combustion engine for vehicles. For reasons of clarity, the internal combustion engine with the combustion chamber is not shown.

The gas injector has a housing 1, in which an injector needle 2 can be displaced centrally. At the free end, the injector needle 2 is provided with a valve plate 3 that, in the closed position shown in FIG. 1, closes an opening 4 of a nozzle 5. It is advantageously designed in one piece with the housing 1 and is provided in a base 6 on the side of the end face of the housing 1.

The injector needle 2 is guided in a sealed manner in a central axial bore 7 of the housing 1. The injector needle 2 projects into a central receiving chamber 8, which extends over approximately half the axial length of the housing and against whose wall a valve housing 9 rests. The valve housing 9 receives a sleeve 10, which rests against the inner wall of the valve housing 9 and surrounds a piston spring 11 at a distance, which in the exemplary embodiment is a helical compression spring having one end resting against a sealing disk 12. It is axially supported by a clamping nut 13, which is screwed into the end of the valve housing 9 facing the housing base 6.

The sealing disk 12 is provided with an annular groove 14 on its outer circumference, in which a sealing ring 15 is located, which rests against the inner wall of the valve housing 9 in a sealing manner.

The sealing disk 12 is seated on a cylindrical connecting piece 16 that guides the injector needle 2 over part of its length.

The sealing disk 12 is provided with an annular groove 17 on its inner circumferential surface, which receives a sealing ring 18 with which the sealing disk 12 is seated in a sealing manner on the connecting piece 16.

The sealing disk 12 is arranged in a manner axially secured on the connecting piece 16. A clamping nut 19 is located on one side of the sealing disk 12, which clamping nut is screwed onto a threaded end 20 protruding beyond the sealing disk 12 in the direction of the housing base 6.

At the other end face, the sealing disk 12 rests against a radial shoulder 21, which bounds a circumferential recess 22 on the outer side of the connecting piece 16, which is open in the direction of the housing base 6. The sealing disk 12 is pressed axially against the radial shoulder 21 by means of the clamping nut 19.

The clamping nut 13 is used to press the sealing disk 12 together with the connecting piece 16 axially against one end of the sleeve 10. Its other end rests against a radial shoulder 23 on the inner side of the valve housing 9.

Advantageously, the sleeve 10 rests against the sealing disk 12 with the interposition of a thin spacer disk 24. The spacer disk 24 rests against the inner wall of the valve housing 9 and, by way of example, has approximately the same thickness as the sleeve 10. This ensures that the spacer disk 24 cannot impede the movements of the piston spring 11.

One end of a bellows 25, which is axially supported at the other end by a piston 26, rests against the end of the connecting piece 16 facing away from the threaded end 20. The bellows 25 surrounds a part of the injector needle 2 and is surrounded by the piston spring 11 at a distance.

The piston 26 has a central axial bore 27 into which the injector needle 2 engages with a tapered end 28. It is designed as a threaded end that is screwed into the axial bore 27 of the piston 26. With the aid of the threaded end 28, the injector needle 2 can be axially positioned exactly inside the gas injector.

The piston 26 has a radial flange 29 with which it rests against the inner side of the valve housing 9.

The part of the piston 26 facing the bellows 25 is designed to be stepped in the outer diameter. The piston spring 11 is supported on the radial flange 29, while the bellows 25 is axially supported on a radial shoulder 30 of the piston 26.

On the axially opposite side of the radial flange 29, the piston 26 is provided with a guide part 31, which has a smaller outer diameter than the radial flange 29 and is axially guided in an inner wall section 32 of the valve housing 9.

At the level of the inner wall section 32, the valve housing 9 has at least one annular groove 33 on its outer circumferential surface, which receives a sealing ring 34 with which the valve housing 9 is sealed with respect to the wall of the injector housing 1 bounding the receiving chamber 8. In the exemplary embodiment, the valve housing 9 advantageously has two annular grooves 33, axially at a distance from one another, with sealing rings 34.

A closing valve 35, the valve spring 36 of which loads a valve plate 37 into the closed position shown in FIG. 1, is seated in the axial bore 27 of the piston 26. The valve spring 36 is axially supported at the free end of the injector needle 2.

In the closed position, the valve plate 37 closes a pressure chamber 38 located in the piston 26, into which supply lines 39 extending from the end face of the piston 26 open.

The pressure chamber 38 is penetrated by a needle 40, which protrudes from the valve plate 37 and cooperates with a valve actuating piston 41. The needle 40 is used for guidance and power transmission, as will be explained. The valve actuating piston 41 is part of a magnetic drive 42 as an actuator, which is also accommodated in the housing 1.

A disk-shaped magnetic armature 43 is axially fixedly seated on the valve actuating piston 41, against which one end of a compression spring 44 rests, which surrounds the valve actuating piston 41 at a distance and is accommodated in a receiving chamber 45.

The receiving chamber 45 is located in a guide part 46, in which the valve actuating piston 41 is axially guided with its end region.

A setting disk 48, the thickness of which determines the pretensioning force of the compression spring 44, rests against the base 47 of the receiving chamber 45. The setting disk 48 rests against the base 47 under the force of the compression spring 44.

Since the design of the magnetic drive 42 is known per se, it will be described only briefly. It has a magnet 49 along with a coil 50 surrounding the guide part 46.

The magnetic drive 42 is pressed axially against a stop 52 with the aid of a clamping nut 51, which is screwed into the free end of the housing 1. The stop 52 is formed by an annular shoulder on the inner side of the housing. The magnetic drive 42 is sealed off from the housing 1 by at least one seal 53. It is advantageously formed by a sealing ring arranged in an annular groove in the inner wall of the housing 1.

The magnet armature 43 axially bounds a medium chamber 54, into which at least one bore 55 in the wall of the housing 1 opens. The medium chamber 54 is also bounded by a part of the housing 1 and a valve clamping nut 56, which is screwed into the free end of the housing 1 and, with the interposition of a setting disk 57, presses the housing 1 against a base 58 of the valve housing 9. The thickness of the setting disk 57 determines the advance of the closing valve 35. The valve clamping nut 56 is sealed against the inner wall of the housing 1.

The setting disk 57 radially bounds an intermediate chamber 59, which is axially bounded by the opposing end faces of a part of the valve housing 9 and the piston 26 and the valve clamping nut 56. The supply lines 39 in the piston 26 along with the supply lines 60 in the valve clamping nut 56 open into the intermediate chamber.

The supply lines 60, like the supply lines 39, are narrow bores through which the medium can flow in a manner to be described. The supply lines 60 connect the intermediate chamber 59 with an annular chamber 61, which is open to the medium chamber 54 and in which the valve clamping nut 56 is arranged. The valve actuating piston 41 projects through the annular chamber 61.

A bore 62 opens into the bore 55 at an obtuse angle, which is provided in a connecting piece 63. It adjoins the outer side of the housing 1 at an obtuse angle and is advantageously designed in one piece with it.

The bore 55 extends axially into the base 58 of the housing 1, in which it is adjoined to a radial bore 64 that connects the axial bore 55 to a nozzle chamber 65 through which the injector needle 2 projects and which is closed by the valve plate 3 in the direction of the combustion chamber of the internal combustion engine.

An axial barrier line 66, in which at least one check valve 67 is seated and upstream of which a filter 68 is connected, opens into the end face on the combustion chamber side of the base 6 of the housing 1. In the exemplary embodiment, two check valves 67 are provided in series, of which the second check valve is provided for safety in the event that the first check valve leaks. The check valves 67 are used to shut off the combustion chamber.

The barrier line 66 opens into a radial bore 69, which opens into an annular channel 9*a* in the valve housing 9. The piston 26 also has a radial bore 26*a*, which opens into the annular channel 9*a* and extends to the closing valve 35.

The closing valve 35 has the valve disk 37, which is under the pressure of a closing valve spring 36 and by which it is loaded into the closed position shown in FIG. 1. The closing valve spring 36 is supported on the end 28 of the injector needle 2.

Gaseous hydrogen under pressure is fed via the connecting piece 63. The gas is under a pressure that is advantageously greater than 10 to 20 bar. By way of example, it is in a range between 30 and 40 bar, but can also be significantly higher. Such high pressure is required when the gas is blown in against the compression pressure in the combustion chamber. If the blowing-in process takes place in the intake phase, the pressure of the gas can approach zero if the flow resistances are small enough. In such a case, the pressure can be between 0 and 10 bar by way of example. Via the bores 55, 64, the gas enters the nozzle chamber 65, which is sealed off from the combustion chamber by the valve plate 3.

The compression and intake phases in the combustion chamber can be easily determined by sensors that detect the angle of rotation of the crankshaft and send the sensor signals to a control system. The respective pressure phase in the combustion chamber can be derived from the angle of rotation. The control system ensures that the gas is fed at high pressure or low pressure depending on the angle of rotation.

The bore 55 is flow-connected to the medium chamber 54, such that the gas is also in the medium chamber 54. By actuating the magnetic drive 42, the magnetic armature 43 is retracted against the force of the compression spring 44. This releases the annular chamber 61 in the valve clamping nut 56, allowing the gas to pass through the annular chamber 61 and the supply lines 60 into the intermediate chamber 59.

When the valve actuating piston 41 is retracted, the force of the spring 36 closes the closing valve 35. The valve spring 36 is set such that the spring pressure is higher than the pressure under which the gas is. For example, the pressure of the valve spring 36 can be set 20 to 30 percent higher than the pressure under which the gas is.

When the closing valve 35 is closed, the piston 26 with the injector needle 2 is displaced axially against the force of the piston spring 11 under the pressure of the gas located in the intermediate chamber 59, causing the valve plate 3 to move to its open position. Now, the gas can enter the combustion chamber via the bore 55, the radial bore 64 and the nozzle chamber 56. In this manner, the blowing-in process begins.

In order to end the blowing-in process, the magnetic drive 42 is switched off. This causes the valve actuating piston 41 to be displaced again by the compression spring 44 in the direction of the valve clamping nut 56, causing the valve actuating piston 41 to pass into the closed position, in which it closes the annular chamber 61. In the process, the needle 40 pushes the valve disk 37 back into its release position against the force of the valve spring 36, such that the gas can escape into the combustion chamber via the supply lines 39, the radial bore 69 and the barrier line 66 through the check valves 67.

The filter 68 ensures that no impurities enter the combustion chamber and no combustion residues and impurities enter the gas injector.

The relief process described takes place prior to compression of the combustion piston located in the combustion chamber, such that the pressure in the combustion chamber does not prevent the relief process described.

The spring 44 of the magnetic drive 42 is set to apply the forces of the valve spring 36 of the closing valve 35 and the tightness at the valve seat in the valve clamping nut 56.

The gas acting on the end face of the piston 26 generates a force exerted on such piston face that is greater than the counterforce generated by the piston spring 11.

The piston spring 11 has a force greater than the force that would open the piston seat of the valve plate 3 by the gas pressure. This ensures that the valve plate 3 reliably seals the valve seat against the high pressure of the gas, which acts on the valve plate 3 via the nozzle chamber 65. The design depends on the force ratios between the sealing diameter of the injector needle 2 and the piston 26.

The exemplary embodiment described represents a pilot-operated gas injector. At the end of the blowing-in process, the gas is discharged into the combustion chamber via the barrier line 66 in the manner described, thus avoiding complicated collection and compression of the residual gas, which would be necessary if the residual gas had to be pumped back into the high-pressure gas tanks. The bellows 25 ensures the leakage-free operation of the gas injector. The bellows 25 is advantageously a metal bellows, with which a loss-free or at most only a very small, non-interfering leakage can be achieved.

Figure 2:
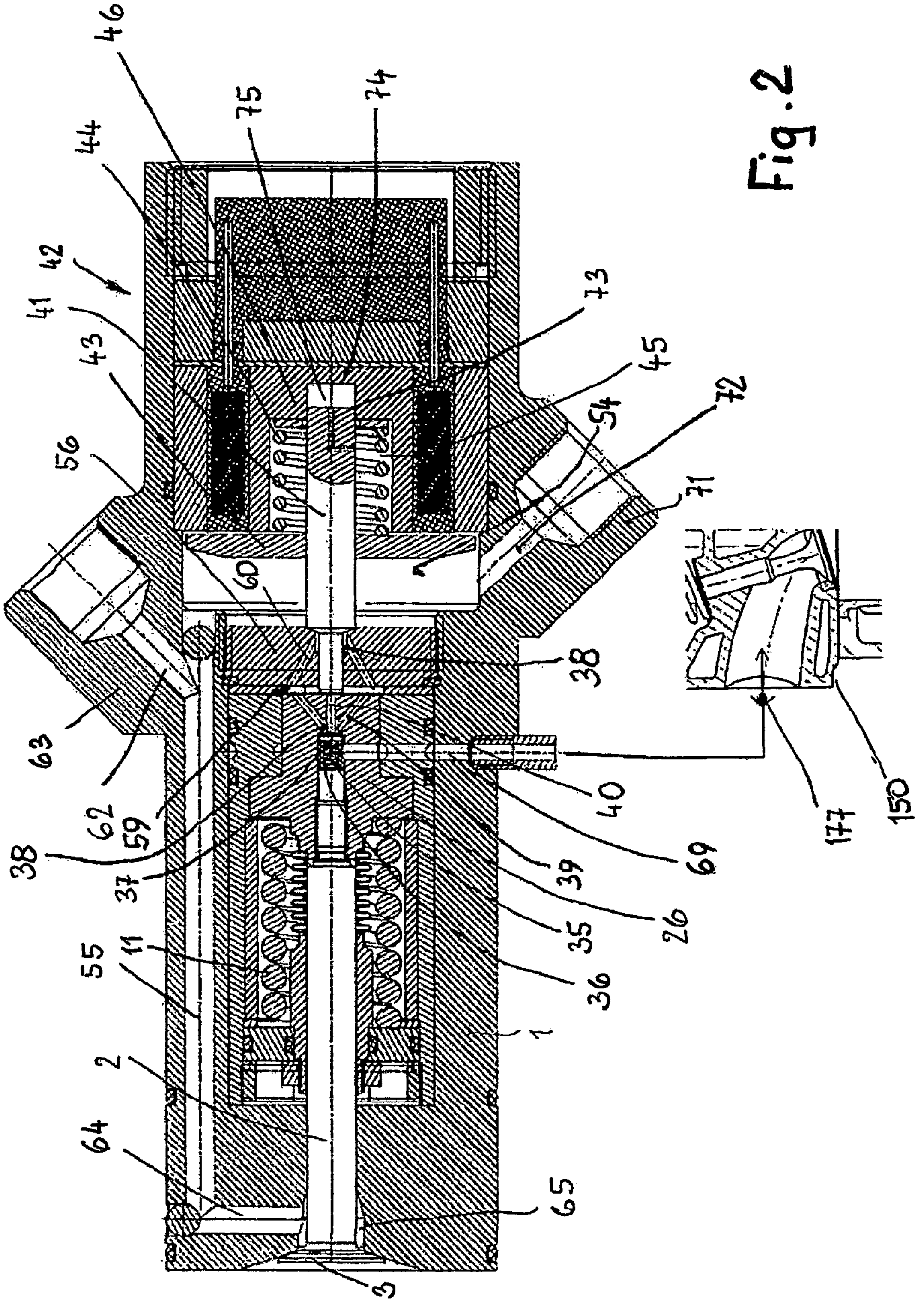
FIG. 2 shows, in axial section, a second embodiment of a gas injector.

The embodiment in accordance with FIG. 2 differs from the exemplary embodiment according to FIG. 1 initially in that a recirculation of the pressurized gas to the combustion chamber does not take place. Accordingly, with this embodiment, a barrier line with a check valve towards the combustion chamber is not present. The radial bore 69 is led radially to the outside through the housing 1. The gas is returned to the tank via the radial bore 69.

The gas injector further has, in addition to the connecting piece 63 for feeding the pressurized gas, a further connecting piece 71, which has a bore 72 that, similarly to the bore 62 of the connecting piece 63, runs at an obtuse angle to the longitudinal axis of the gas injector. The bore 72 opens into the medium chamber 54 between the valve clamping nut 56 and the magnetic armature 43 of the magnetic drive 42.

In contrast to the previous embodiment, the bore 55 is closed against the medium chamber 54.

With the previous embodiment, the gas to be blown in also serves as a control medium with which the injector needle 2 is displaced. With the exemplary embodiment according to FIG. 2, an additional control medium is used to displace the injector needle 2. It is fed via the connecting piece 71. The pressure of the control medium can be comparable to the pressure of the gas fed to the combustion chamber via the connecting piece 63 in the manner described. The control medium pressure can also be higher or lower than the gas pressure. By way of example, the smaller control medium pressure is advantageous when higher system pressures that are unsuitable for controlling the injector needle 2 arise.

In order to start the blowing-in process, the magnetic drive 42 is switched on, causing the magnetic armature 43 and thus the valve actuating piston 41 to be pushed back against the force of the compression spring 44. Since, thereby, the valve actuating piston 41 lifts off the needle 40 of the valve plate 37 of the closing valve 35, the valve spring 36 presses the valve plate 37 into its sealing seat.

When the valve actuating piston 41 is pushed back, the pressure chamber 38 is released, such that the control medium can pass from the medium chamber 54 via the supply lines 60 into the intermediate chamber 59. The pressure exerted on the piston 26 by the control medium is greater than the counterforce exerted by the piston spring 11, such that the piston 26 and thus the injector needle 2 are displaced. This displaces the valve plate 3 to its open position, such that the gas fed via the connecting piece 63 can enter the nozzle chamber 65 via the bores 55 and 64.

Since the piston 26 is acted upon by the separate control medium, the piston 26 can be designed to be smaller than with the previous embodiment if necessary.

The pressure of the control medium entering the medium chamber 54 is generated by an external pump (not shown). This prevents the leakage of gas, because it is not used to control the gas injector. Oil, such as pentosene or silicone oil, but also cooling water, for example, can be used as a medium. Such medium can additionally be used for cooling the injector.

In order to end the blowing-in process, the magnetic drive 42 is switched off, causing the magnetic armature 43 and thus the valve actuating piston 41 to be displaced by the spring 44 back to the closed position shown in FIG. 2, wherein the needle 40 of the valve plate 37 is pushed back. This releases the supply lines 39 in piston 26, such that the control medium can pass from the intermediate chamber 59 via the pressure chamber 38 into radial bore 69 and from there to the tank or to an induction manifold 150 (FIG. 2) or to an induction system of the internal combustion engine. The line to the induction manifold 150 can be provided with a check valve 177 in order to prevent pressure peaks from the induction manifold to the injector. Such relief process is independent of the compression in the combustion chamber, such that the blowing in of the gas can take place at any time.

The exemplary embodiment in accordance with FIG. 2 also represents a pilot-operated gas injector with which the control medium is recirculated. The recirculation takes place in the induction manifold or the induction system of the combustion engine if the control medium is a gas. If, rather than a gas, a liquid is used as the control medium, it is returned to the tank from which the liquid was fed.

FIG. 2 further shows a relief bore 73 at the free end of the valve actuating piston 41. The relief bore 73 connects the chamber 75 located between the valve actuating piston 41 and the base 74 of the guide part 46 with the receiving chamber 45 for the compression spring 44. An identical relief bore 73 is also provided with the previous embodiment. The relief bore 73 serves primarily for damping by the throttling effect.

Figure 3:
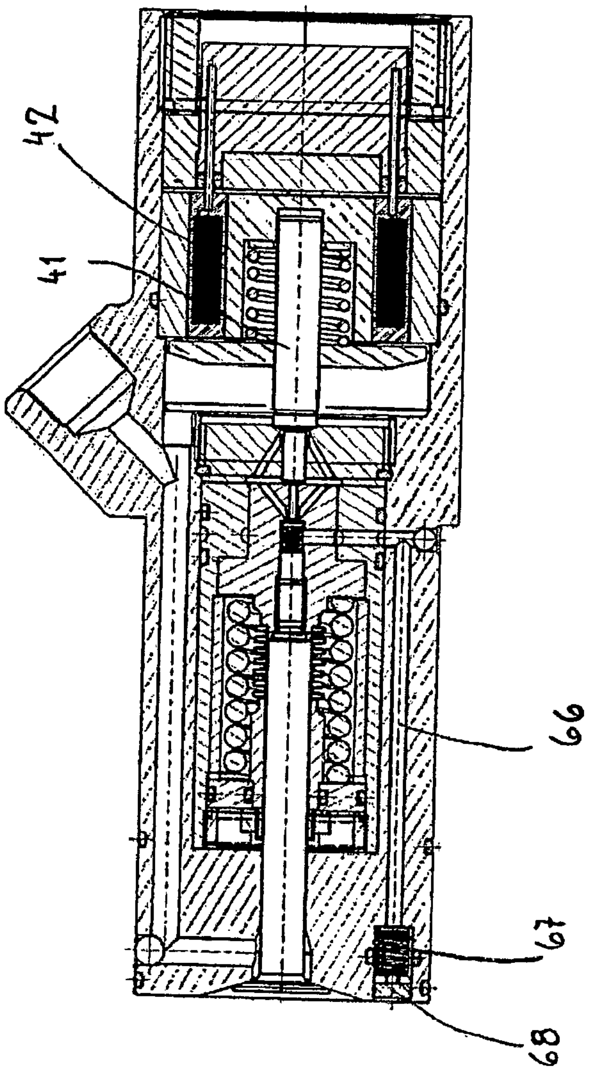
FIG. 3 shows, in axial section, a third embodiment of a gas injector.

FIG. 3 shows a pilot-operated gas injector that, in principle, has the same design as the exemplary embodiment in accordance with FIG. 1. The only difference is that there is only a single check valve 67 in the barrier line 66, which is advantageously preceded by a filter 68. As has been explained with reference to FIG. 1, if the magnetic drive 42 is turned off and the valve actuating piston 41 is returned to its closed position, shown in FIG. 3, the remainder of the gas can be directed into the combustion chamber via the barrier line 66 and the check valve 67.

Figure 4:
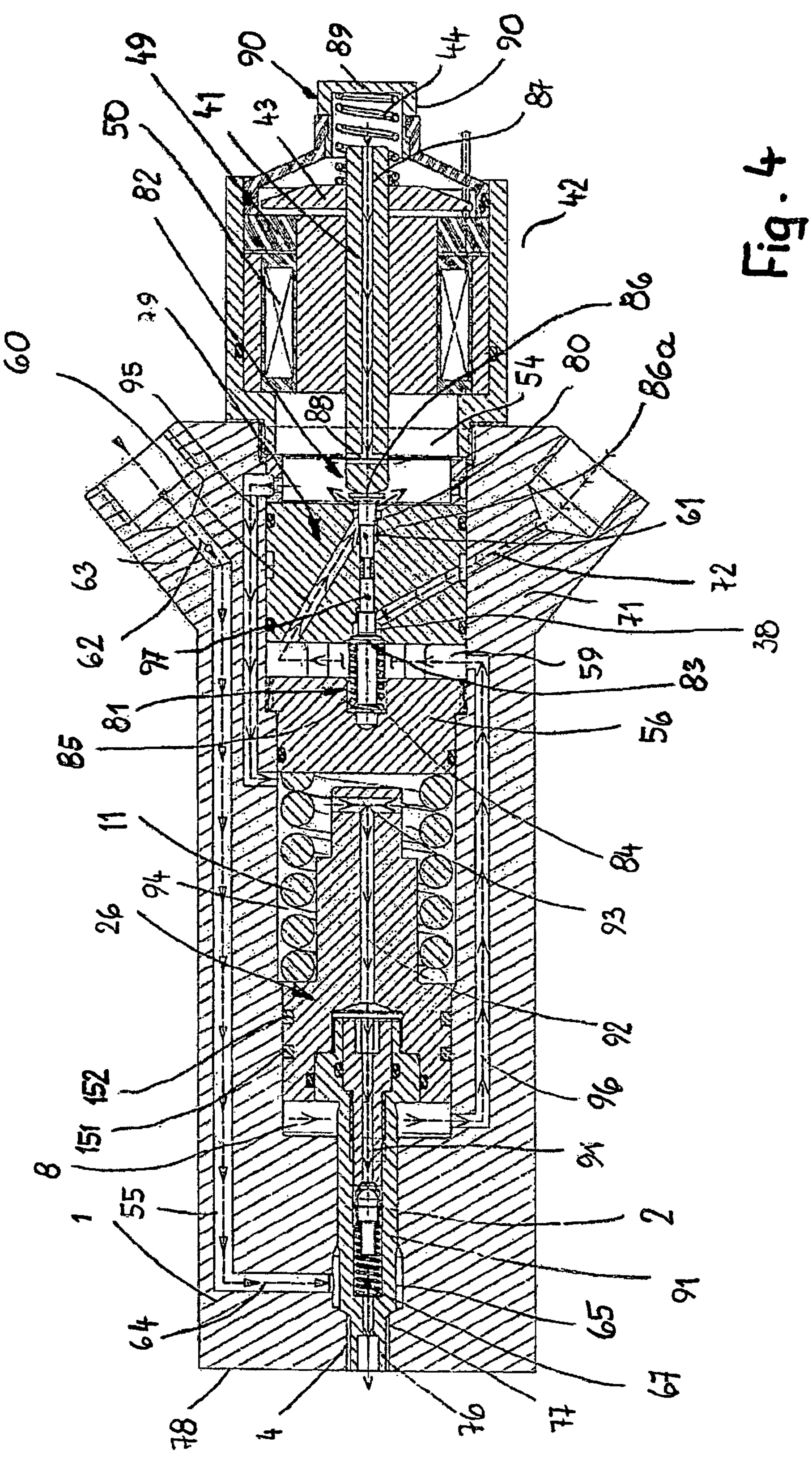
FIG. 4 shows, in axial section, a fourth embodiment of a gas injector in the closed state.
Figure 5:
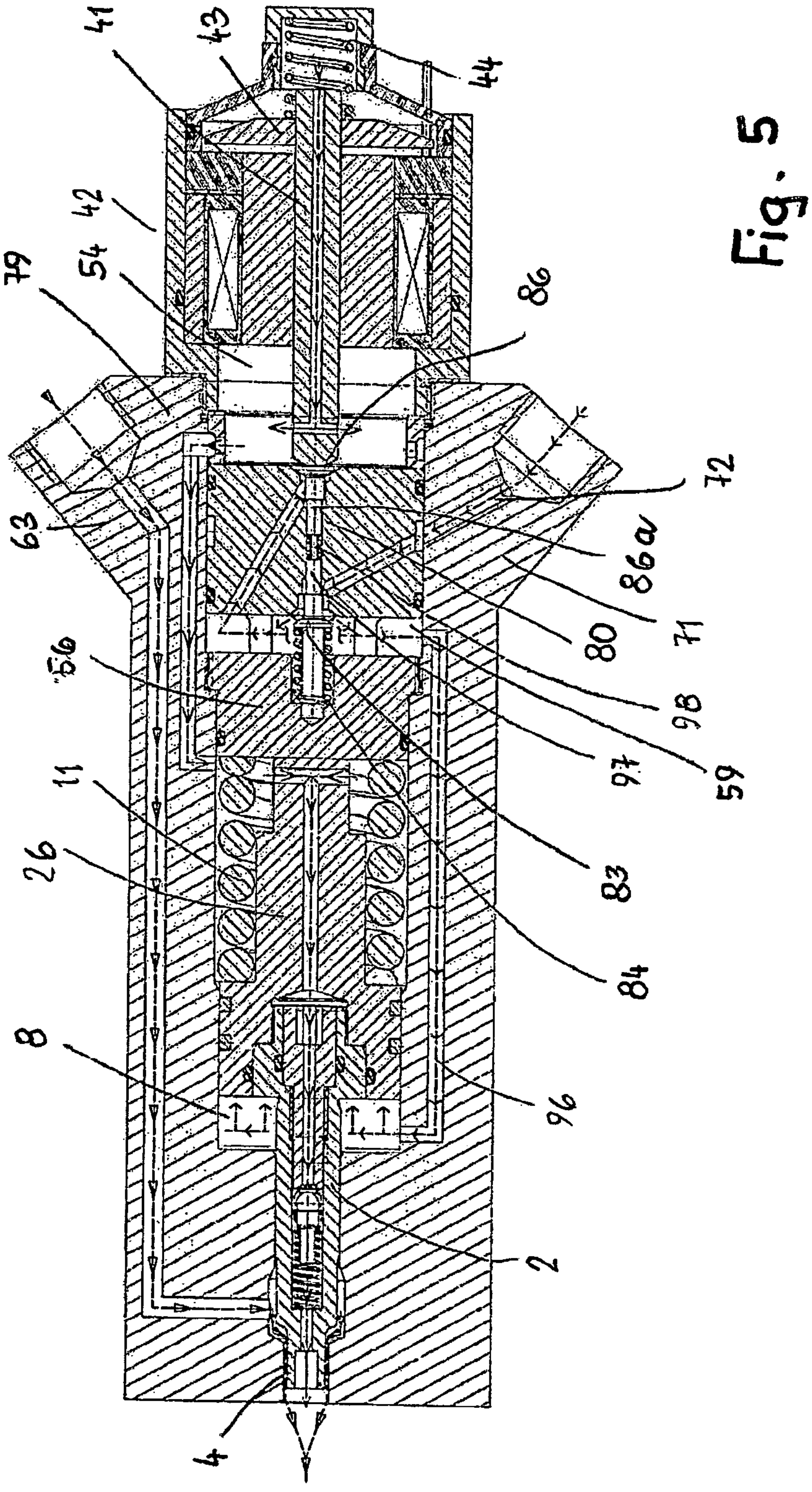
FIG. 5 shows the gas injector in accordance with FIG. 4 in the open state.

FIGS. 4 and 5 show a gas injector with which the pressure is relieved by means of a bore drilled centrally in the injector. This saves installation space and keeps the outer diameter of the gas injector very small.

The gas injector has the connecting piece 63 for feeding the gas and the further connecting piece 71 similar to the embodiment in accordance with FIG. 2. The bore 62 of the connecting piece 63 connects at an obtuse angle to the axial bore 55, which is flow-connected at the other end to the radial bore 64 through which the gas enters the nozzle chamber 65. In contrast to the previous exemplary embodiments, the nozzle chamber 65 is located inside the housing 1 and at a distance from the housing end face 78. The injector needle 2 closes the nozzle opening 4 in the closed position shown in FIG. 4. To open the nozzle opening 4, the injector needle 2 is displaced inward in contrast to the previous exemplary embodiments.

The nozzle opening 4 is provided as a jet guide for the gas to be blown in, which improves the blowing-in process.

The injector needle 2 has a central extension 76 located in a bore 77, which extends from the pressure chamber 65 to the end face 78 of the housing 1. The extension 76 and the bore 77 are designed so that the gas can flow through the bore 77 into the combustion chamber when the valve is open. In the exemplary embodiment, the bore 77 has a cylindrical wall that surrounds the cylindrically designed extension 76 at a distance. This creates a narrow annular chamber for the gas between the bore wall and the circumference of the extension 76.

The injector needle 2 is provided with a central through bore 91, in which the check valve 67 is arranged, which seals the combustion chamber (not shown) against the gas injector.

The end facing away from the extension 76 is seated in e a sealed manner in the piston 26, which is under the force of the piston spring 11, with which the piston 26 is loaded in the direction of the closed position of the injector needle 2. In accordance with the previous embodiments, the piston 26 is arranged in a sealed manner in the housing 1. Sealing is achieved by means of two piston rings 151, 152, which are at an axial distance one behind the other and are preferably made of metal. In contrast to the previous exemplary embodiments, the piston 26 directly rests against the inner wall of the receiving chamber 8 of the housing 1. The piston spring 11 is supported by the valve clamping nut 56, which, together with an opposite valve block 79 axially spaced at a distance, bounds the intermediate chamber 59.

The valve block 79 is penetrated by a central axial bore 80, the two ends of which can each be closed by a valve 81, 82. The valve 81 opposite the valve clamping nut 56 has a valve head 83 loaded by a valve spring 84 supported at the base of a blind hole 85 in the end face of the valve clamping nut 56.

The valve 82 cooperates with the valve actuating piston 41, which is part of the magnetic drive 42. The valve 82 has a valve element 86 that can be used to close the annular chamber 61.

The valve actuating piston 41 has an axial bore 87 that extends from its end facing away from the valve block 79 to near the valve end and is adjoined to a cross bore 88, which is provided in the medium chamber 54 between the magnetic drive 42 and the valve block 79 in the valve housing 1.

On the side of the magnetic drive 42 facing away from the valve block 79, the magnetic armature 43, which is loaded by the spring 44, is axially fixedly seated on the valve actuating piston 41. It is supported axially on the base 89 of a housing-like attachment 90, into which the valve actuating piston 41 projects.

The annular chamber 61 in the valve block 79 is line-connected to the intermediate chamber 59 via at least one supply line 60.

The bore 72 of the connecting piece 71 opens into the pressure chamber 38, which can be closed by the valve plate 83.

In the closed position shown in FIG. 4, the valve plate 83 closes the pressure chamber 38 under the pressure of the valve spring 84. The valve plate 83 has a valve tappet 97, which is guided in the bore 80 of the valve block 79 and rests against the free end of a valve tappet 86*a* of the valve plate 86 inside the bore 80. The valve tappet 86*a* guides the valve plate 86 in the bore 80.

The injector needle 2 is penetrated centrally by an axial bore 91, in which the check valve 67 is seated. The axial bore 91 is flow-connected to a central axial bore 92 in the piston 26. It opens into a cross bore 93, which is flow-connected to a spring chamber 94, in which the piston spring 11 is accommodated. The spring chamber 94 is flow-connected to the medium chamber 54 via a line 95.

In the closed position in accordance with FIG. 4, the gas fed under pressure via the connecting piece 63 cannot escape into the combustion chamber, because the injector needle 2 closes the opening 4. The injector needle 2 is in contact with the valve seat under the pressure of the piston spring 11 and thus closes the opening 4 of the gas injector.

The receiving chamber 8 in front of the piston 26 is constantly connected to the intermediate chamber 59 via at least one line 96.

The valve plate 83 closes the pressure chamber 38 under the force of the valve spring 84, such that no control medium can enter the intermediate chamber 59 via the connecting piece 71.

The valve plate 86 assumes its open position, such that the annular chamber 61 is connected to the medium chamber 54. The valve actuating piston 41 is retracted when the magnetic drive 42 is switched off.

In order to start the injector process, the magnetic drive 42 is switched on, causing the valve actuating piston 41 to be displaced by means of the magnetic armature 43 to such an extent that it adjusts the valve element 86 to its closed position (FIG. 5).

A compression spring 98, which surrounds end sections of the valve tappets 97, 86*a* that are smaller in diameter and is supported with its ends on the annular shoulders of the valve tappets 97, 86*a*, is located between the valve tappet 86*a* of the valve plate 86 located in the bore 80 of the valve block 79 and the valve tappet 97 of the valve plate 83 located in the bore 80. During the switching process, the compression spring 98 ensures that the two valve tappets 97, 86*a* are constantly in contact with one another.

When the valve plate 83 assumes its open position (FIG. 5), the control medium fed under pressure via the connecting piece 71 can flow via the bore 72 into the intermediate chamber 59 and from there via the line 96 into the receiving chamber 8. This causes the piston 26 to be displaced by the control medium against the force of the piston spring 11, causing the injector needle 2 to be pushed back and the opening 4 to be released, such that the gas fed via the connecting piece 63 can now enter the combustion chamber.

When the magnetic drive 42 is switched off, the movement of the functional parts takes place in the reverse direction. The magnetic armature 43 is retracted, causing the valve plate 86 to pass into its open position. This is achieved by the valve spring 84 displacing the valve plate 83 back to its closed position to the extent that the valve tappet 86*a* of the valve plate 86 is pushed back. The control medium can then pass from the intermediate chamber 59 into the medium chamber 54 via the supply line 60. The pressure medium can enter the spring chamber 94 via the line 95 and from there via the cross bore 93 into the axial bores 92 and 91.

Due to the set pressure of the gas, it is possible to feed the residual gas into the combustion chamber only during the compression or intake phase, such that it is also burned. The check valve 67 is set to be opened by the residual gas flowing through the axial bores 91, 92.

The check valve 67 is set as a function of the compression pressure in the combustion chamber of the engine and can be set, for example, to a pressure between 0 and 20 bar.

The described embodiment is characterized by its compact design. The contributing factor here is that the gas injector opens inward, in that the injector needle 2 is displaced from its closed position in accordance with FIG. 4 back into the open position in accordance with FIG. 5

The gas injector can of course also be used at higher compression pressures.

At lower pressures or during the intake phase of the combustion engine, the relief can take place prior to the compression phase in the combustion chamber. Then, a very small pressure can be set at the check valve 67.

Figure 6:
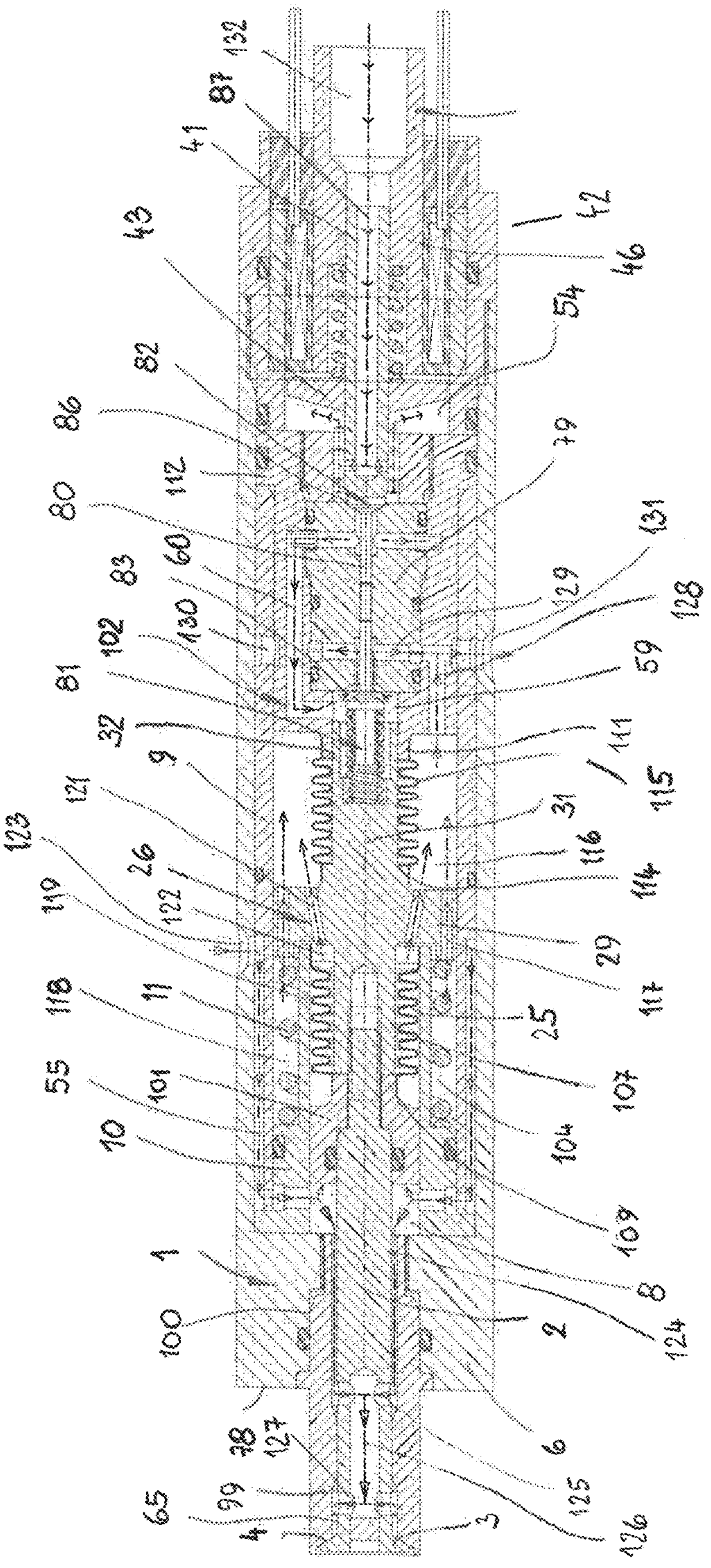
FIG. 6 shows, in axial section, a fifth embodiment of a gas injector in the closed state.
Figure 7:
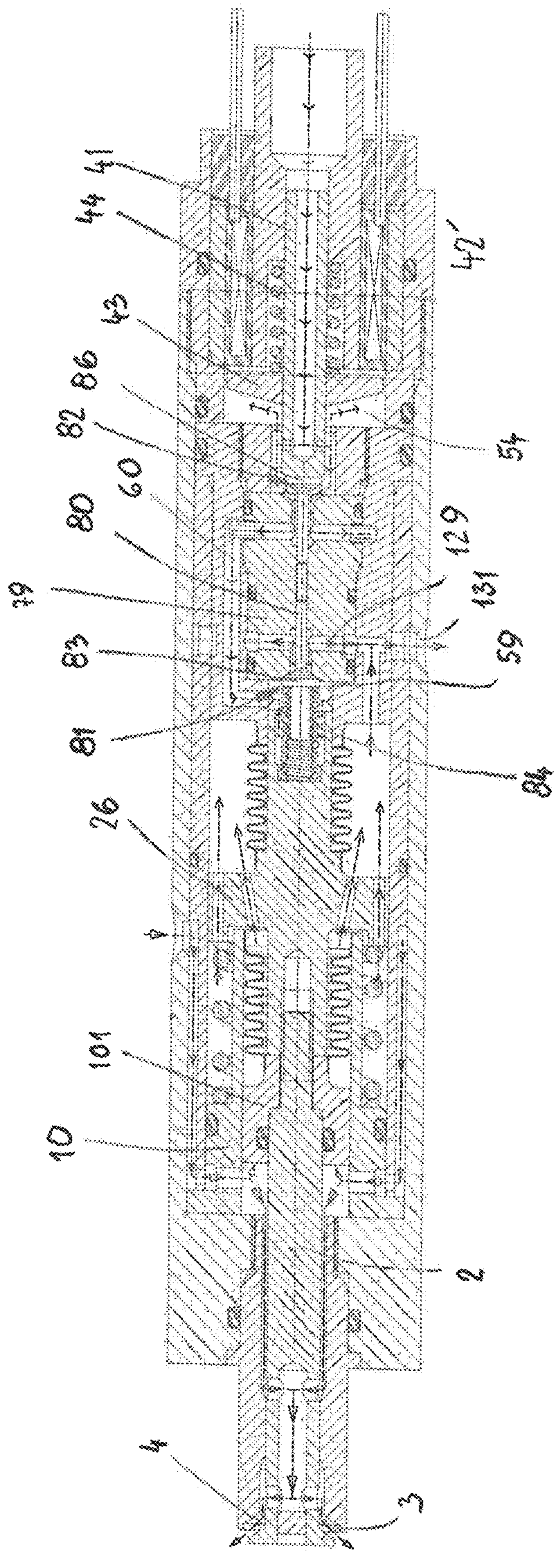
FIG. 7 shows the gas injector in accordance with FIG. 6 in the open state.

Like the previous embodiment, the gas injector in accordance with FIGS. 6 and 7 is characterized by a compact design with only a small diameter.

For better understanding, in FIGS. 6 and 7—as in FIGS. 4 and 5—the flow paths of the gas to be blown into the combustion chamber are indicated by corresponding arrows.

The gas injector has the housing 1, over one end face 78 of which a nozzle 99 protrudes axially. It has the nozzle opening 4, which can be closed by the valve plate 3, which is provided at one end of the injector needle 2.

The nozzle 99 is held in a sealed manner in a receptacle 100, which is provided in the base 6 of the housing 1.

The injector needle 2 is axially fixedly connected to a compensation piston 101 and the piston 26. The piston 26 is axially displaceably guided on the inner wall of the valve housing 9, which is held in a sealed manner on the inner wall of the housing 1.

The compensation piston 101 is located inside the sleeve 10, which is received by the valve housing 9 and held in a sealed manner to its inner surface.

The sleeve 10 is provided on the outside with an annular groove-like recess 104 in which the piston spring 11 is located. It loads the piston 26 axially.

The sleeve 10 surrounds the bellows 25, which is fastened by its two ends to the compensation piston 101 and to the inner side of the sleeve 103. The bellows 25 surrounds a sleeve-shaped attachment 107 of the piston 26. The attachment 107 protrudes centrally and axially from the radial flange 29 of the piston 26 and rests on its end face against a sleeve-shaped attachment 109 of the compensation piston 101.

At its other end face, the piston 26 has the further centrally arranged axial guide part 31, which by way of example can have the same outer diameter as the attachment 107.

The free end of the guide part 31 projects into an axial sleeve-shaped attachment 111 of a housing part 102, which projects axially into the valve housing 9 and rests against its inner side.

At its end turned away from the piston 26, the housing part 102 has an outwardly protruding annular flange 112 that rests against the inner side of the housing 1 and the free end of the valve housing 9.

At the other end, the housing part 102 is provided with the sleeve-shaped attachment 111, which rests against the free end of the guide part 31 of the piston 26. The attachment 111 is opposite axially at a distance from an annular shoulder 114 of the piston 26. A bellows 115 surrounds the guide part 31 of the piston 26 and is fastened to the attachment 111 of the housing part 102 and to the guide part 31 of the piston 26.

An annular chamber 116, which is bounded radially outwardly by the valve housing 9 and radially inwardly by the bellows 115, which prevents leakage into the unpressurized annular chamber 116, is located between the radial flange 29 of the piston 26 and the housing part 102. The annular chamber 116 is connected via at least one bore 117 to an annular chamber 118, which is bounded radially outwardly by the valve housing 9 and radially inwardly by a sleeve section 119 of the sleeve 10. In the axial direction, the annular chamber 118 is bounded by the sleeve 10 along with the radial flange 29 of the piston 26. The annular chamber 118 accommodates the piston spring 11, which is supported axially on the sleeve 10 and on the radial flange 29 of the piston 26.

The sleeve section 119 bounds the stroke of the piston 26 and thus of the injector needle 2.

The annular chamber 116 is also connected, via at least one bore 121 in the radial flange 29 of the piston 26, to a narrow annular chamber 122 present between the bellows 25 and the sleeve-shaped attachment 107 of the piston 26.

The housing 1 of the injector has a pressure port 123 through which the gas to be blown into the combustion chamber is fed. The pressure port 123 is adjoined by the bore 55 in the form of an annular chamber, which opens into the receiving chamber 8, through which the injector needle 2 projects axially.

An annular line 124 surrounding the injector needle 2 opens into the ring-shaped receiving chamber 8, which is provided between the inner wall of the nozzle 99 and the injector needle 2. Via a cross bore 125 in the injector needle 2, the annular line 124 is connected to a central axial bore 26 in the injector needle 2. The axial bore 126 is axially closed to the outside and connected via a cross bore 127 to the nozzle chamber 65, which is arranged between the inner wall of the nozzle 99 and the injector needle 2, and can be closed by the valve plate 3.

The guide part 31 of the piston 26 accommodates the valve 81. Its valve plate 83 can close the axial bore 80 in the valve block 79, as explained with reference to the previous embodiment. The other end of the bore 80 can be closed with the valve 82.

In accordance with the previous embodiment, the bore 80 is connected to the intermediate chamber 59 via the supply line 60.

The annular chamber 118 is flow-connected to the annular chamber 116 via the at least one axial bore 117 in the manner described. The annular chamber 116, for its part, is connected via at least one axial bore 128 in the housing part 102 and a cross bore 129 in the valve block 79 adjoining the latter to an annular channel 130, which is provided in the valve housing 9 and is connected to a tank port 131 in the housing 1.

The valve plate 86 of the valve 82 cooperates with the valve actuating piston 41 of the magnetic drive 42. The magnetic armature 43, which is arranged in the medium chamber 54, is axially fixedly seated on the valve actuating piston 41.

In accordance with the previous embodiment, the valve actuating piston 41 is designed as a hollow piston, whose axial bore 87 is connected to a control port 132, which is part of the guide part 46.

FIG. 6 shows the injector in the closed state, in which the valve plate 3 closes the nozzle opening 4. The magnetic drive 42 is switched off, wherein the valve actuating piston 41 pushes the valve plate 86 of the valve 82 to its closed position.

The gas to be blown in is pressurized via the pressure port 123. It enters the receiving chamber 8 via the bore 55, in which it axially loads the compensation piston 101. A part of the gas passes from the receiving chamber 8 into the annular line 124 and from there via the cross bore 125, the axial bore 126 and the cross bore 127 into the nozzle chamber 65, which is closed by the valve plate 3.

The bellows 25 is firmly connected to the compensation piston 101 and the sleeve section 119 of the sleeve 10, for example by a welding process. This compensates and balances the force that the injector needle 2 wants to open due to the force exerted on the valve plate 3. This compensation force can be adapted to the technical needs. If, for example, the sealing function is to be increased in the region of the nozzle opening 4, the closing force can be set higher accordingly. In such a case, the compensation piston 101 can be designed correspondingly larger.

If, on the other hand, the opening of the nozzle opening 4 is to be assisted by the injector needle 2, the compensation piston 101 can be designed to be correspondingly smaller.

The bellows 115 surrounding the guide part 31 of the piston 26 improves the leak-free design of the injector. The bellows 115 is tightly connected to the piston 26 and the housing part 102, for example by welding.

The only amount of control medium that must be dissipated to the outside is the switching leakage. It can be routed via the port 131, for example, to the intake manifold (not shown) of the engine. However, the switching leakage can also be directed into the combustion chamber via a line (not shown) in the injector needle 2 in the combustion engine.

In this manner, the switching leakage is burned. Since switching leakage occurs only in very small quantities, its influence on the running behavior of the engine is negligible.

In order to start the injector process, the magnetic drive 42 is switched on, causing the valve actuating piston 41 to be retracted against the force of the compression spring 44 via the magnetic armature 43. The valve plate 86 of the valve 82 is opened under the pressure prevailing in the bore 80 in the valve block 79, such that the medium located therein can pass through the opened valve 82 into the medium chamber 54.

The pressure in the bore 80 is generated by moving the valve plate 83 of the valve 81 to its closed position under the force of the valve spring 84.

When the valve plate 83 is adjusted to the closed position, the control medium is pressurized in the bore 80, the supply line 60 and in the intermediate chamber 59. As a result, the piston 26 is axially pressurized by the control medium. The injector needle 2, which is axially fixedly connected to the piston 26, is displaced, causing the valve plate 3 to lift off from the nozzle opening 4, such that the gas present can enter the combustion chamber.

The stroke of the injector needle 2 is bounded by the stop of the piston 26 on the sleeve 10. The stroke of the injector needle 2 is usually between approximately 0.1 and approximately 0.3 mm.

In order to close the blowing-in valve 3, 4, the magnetic drive 42 is switched off. This has the consequence that the magnetic armature 43 is pushed back under the force of the compression spring 44, causing the valve plate 86 to move back to its closed position (FIG. 6).

This opens the valve 81 and relieves the intermediate chamber 59, such that the injector needle 2 can return to its closed position in accordance with FIG. 6.

Due to the pressure relief in the medium chamber 59, the compensation piston 101 is pushed back via the piston 26 by the piston spring 11, causing the injector needle 2 to be displaced to its closed position accordingly.

Figure 8:
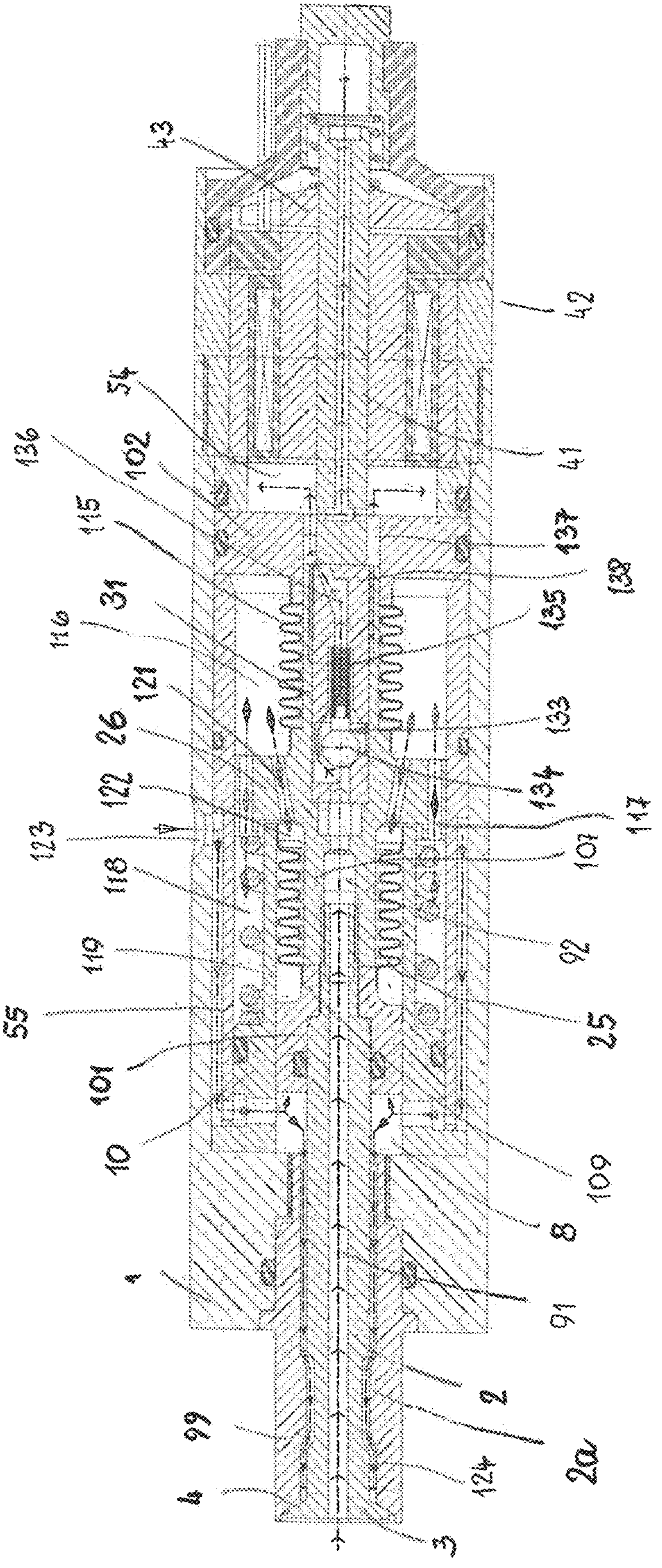
FIG. 8 shows, in axial section, a sixth embodiment of a gas injector in the closed state.
Figure 9:
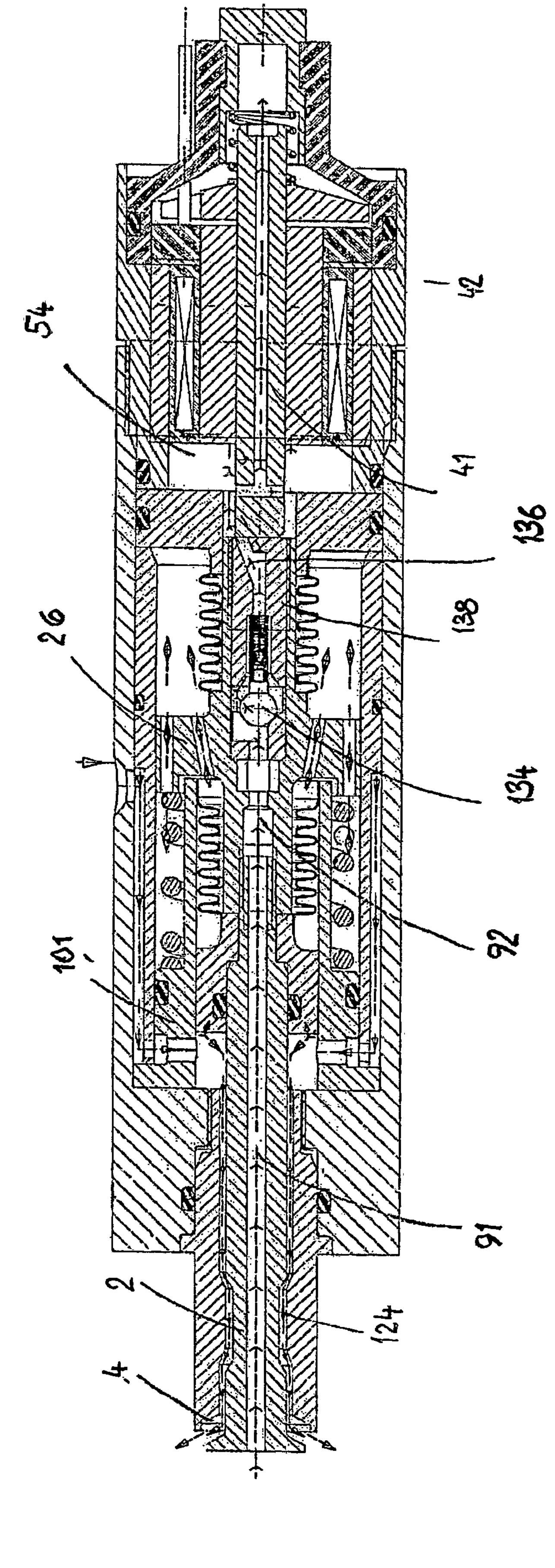
FIG. 9 shows the gas injector in accordance with FIG. 8 in the open state.

The gas injector in accordance with FIGS. 8 and 9 is a directly controlled version without switching valves. The injector has the nozzle 99 protruding axially beyond the housing 1 with the valve plate 3, with which the nozzle opening 4 can be closed and which is provided at the free end of the injector needle 2. It is axially fixedly connected to the compensation piston 101 and the piston 26. The compensation piston 101 is accommodated in the sleeve 10 in the manner described, the free end of which forms a stop for the piston 26 during its axial displacement. The bellows 25, which is fastened at one end to the sleeve-shaped attachment 109 and at the other end to the inner side of the sleeve section 119 of the sleeve 10, is located between the sleeve section 119 and the sleeve sections 107, 109 of the piston 26 and the compensation piston 101.

The sleeve-shaped guide part 31 of the piston 26 accommodates a check valve 133, the valve element of which is a valve ball 134 that is under the force of a valve spring 135. The check valve 133 prevents the combustion chamber pressure from entering the piston chamber above a certain pressure value. The check valve 133 cooperates with the valve actuating piston 41, on which the magnetic armature 43 is axially fixedly seated. The magnetic drive 42 is designed to be substantially the same as with the exemplary embodiment according to FIGS. 4 and 5.

The bellows 115 is arranged on the guide part 31 of the piston 26, the two ends of which are firmly connected to the piston 26 and to the housing part 102.

The medium chamber 54 is arranged between the magnetic drive 42 and the housing part 102. The control medium is used to initiate the displacement of the injector needle 2 to its open position, as explained with reference to the previous exemplary embodiments.

The injector needle 2 is designed as a hollow needle and has the axial bore 91, to which the axial bore 92 of the sleeve-shaped attachment 107 of the piston 26 is adjoined. The axial bore 92 extends to the check valve 133.

The injector needle 2 has a section 2*a* in the nozzle 99 that is tapered in cross-section and has a square cross-section. Since the wall of the annular line 124 is cylindrical, passages for the gas are formed between the square sides of the section 2*a* and the cylinder wall. The section 2*a* serves to guide the injector needle 2 during the displacement movement, wherein the edges of the section 2*a* rest against the cylinder wall of the annular line 124. In the remaining region, the injector needle 2 has a circular contour.

Since the axial bore 91 opens into the combustion chamber of the engine, the valve ball 134 in the closed position prevents the combustion chamber pressure from reaching the injector beyond the check valve 134.

The check valve 133 has a bore 136 behind the valve ball 134, which communicates with the medium chamber 54 via an annular chamber 137 surrounding the adjacent end of the valve actuating piston 41.

As with the previous embodiment, the bores 117, 121 present in the piston 26 serve to equalize the pressure between the annular chambers 116, 118 along with 122, 116.

FIG. 8 shows the gas injector in the closed state, with which the nozzle opening 4 is closed by the valve plate 3 of the injector needle 2. The valve actuating piston 41 rests in an axial manner with the valve housing 138 of the check valve 133.

The gas is fed via the pressure connection 123 through the annular chamber 55, the receiving chamber 8 and the annular line 124 between the nozzle 99 and the injector needle 2 to the valve seat 3, 4. Inside the receiving chamber 8, the compensation piston 101 is subjected to axial pressure by the gas.

If the gas is to be injected into the combustion chamber, the magnetic drive 42 is switched on, causing the valve actuating piston 41 to be displaced axially against the check valve 133 in the manner described. Since the valve housing 138 is non-displaceably arranged in the piston 26, this causes the piston 26 and thus also the compensation piston 101 to be displaced axially. Accordingly, in the manner described, the injector needle 2 is displaced to its open position shown in FIG. 9, such that the gas from the annular line 124 can enter the combustion chamber via the open nozzle opening 4.

As shown by the flow arrows, the combustion chamber pressure can pass the valve ball 134 via the axial bores 91, 92 and enter the medium chamber 54 via the bore 136. As a result, the magnetic force for displacing the valve actuating piston 41 can be relatively small. Accordingly, the gas injector can be made smaller, such that it can be better installed in the cylinder head of the engine.

In order to end the injection process, the magnetic drive 42 is switched off in the manner described, causing the valve actuating piston 41 to be displaced back to its initial position. Under the pressure of the gas in the receiving chamber 8, the compensation piston 101 and thus also the piston 26 are pushed back, causing the injector needle 2 to be displaced into its closed position in accordance with FIG. 8.

Figure 10:
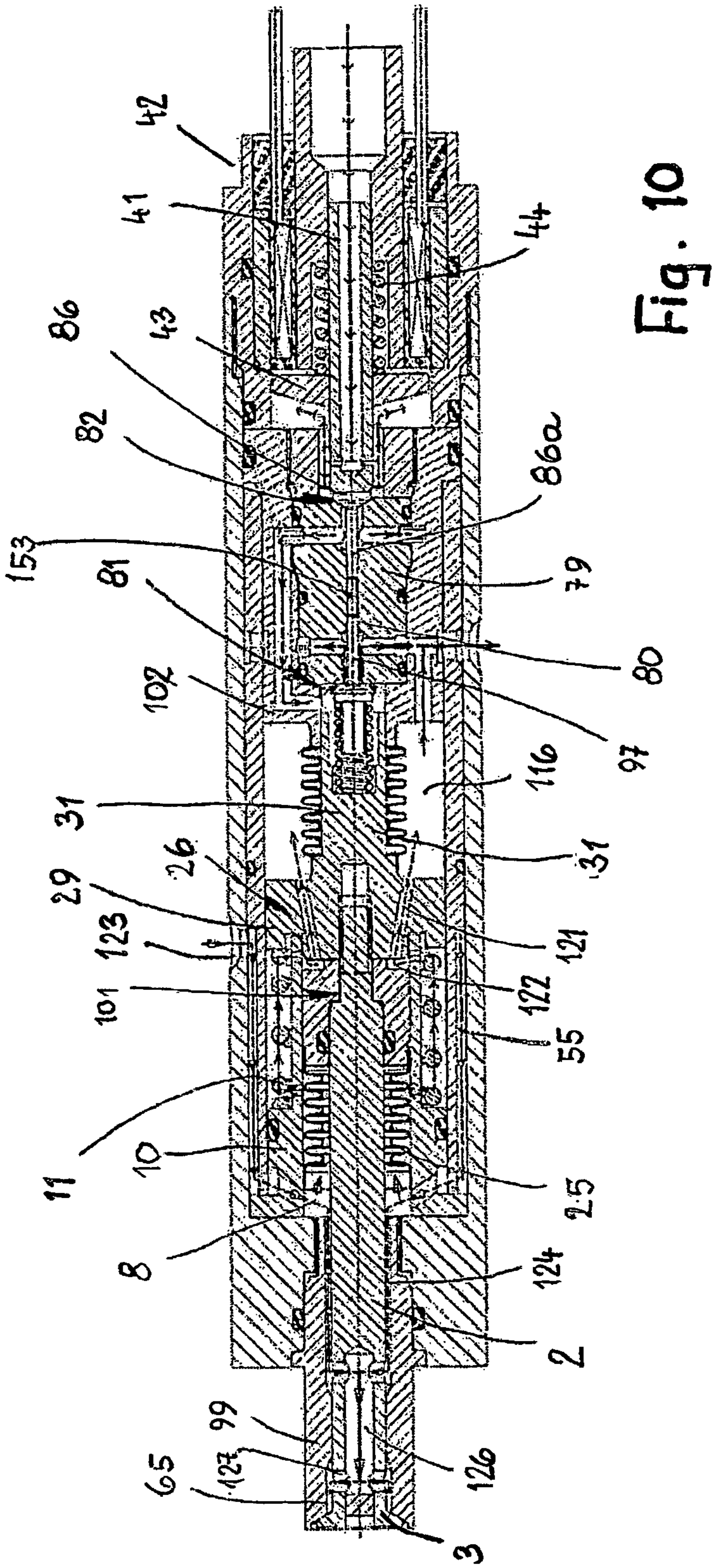
FIG. 10 shows, in axial section, a seventh embodiment of a gas injector in the closed state.
Figure 11:
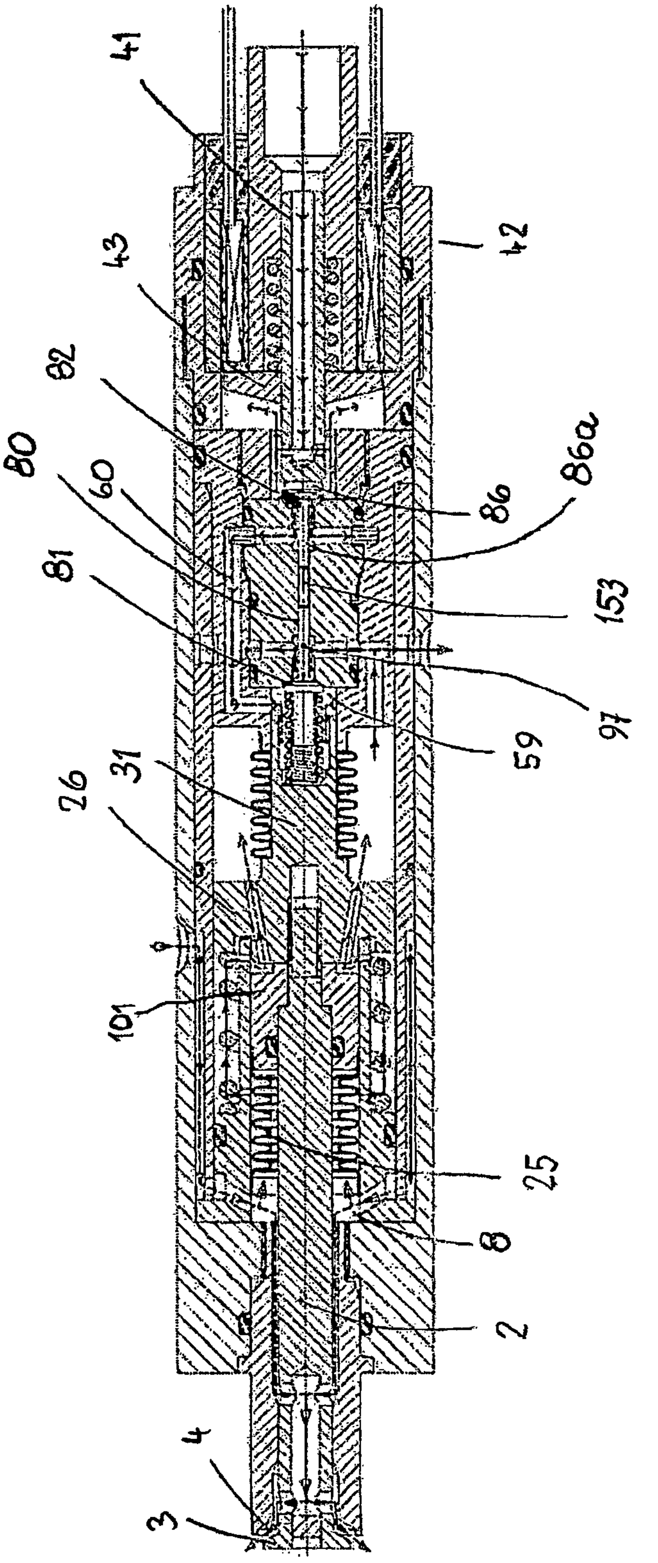
FIG. 11 shows the gas injector in accordance with FIG. 10 in the open state.

The injector in accordance with FIGS. 10 and 11 is similar in design to the embodiment according to FIGS. 6 and 7. In contrast to this embodiment, the compensation piston 101 does not have any sleeve-shaped extensions, but rests directly against the piston 26 and is firmly connected, preferably welded, to the piston 26 at the outer diameter. It has only the sleeve-shaped guide part 31, while its radial flange 29 rests against the end face of the compensation piston 101.

The bellows 25 surrounds the injector needle 2 and is arranged between the sleeve 10 and the injector needle 2. The bellows 25 has one end fastened in a sealing manner to the compensation piston 101 and the other end fastened in a sealing manner to the inner side of the sleeve 10.

The gas fed via the pressure port 123 enters the receiving chamber 8 via the annular line 55, into which the annular line 124 opens between the nozzle 99 and the injector needle 2. The annular line 124 is flow-connected to the axial bore 126 of the injector needle 2. The cross bore 127 connects the axial bore 126 to the nozzle chamber 65, which is closed in the direction of the combustion chamber.

The bores 121 in the piston 26 connect the annular chamber 122 to the annular chamber 116 between the piston 26 and the housing part 102.

The mode of operation of the injector corresponds to the mode of operation of the embodiment according to FIGS. 6 and 7. The valve actuating piston 41 of the magnetic drive 42 holds the valve plate 86 of the valve 82 in the closed position (FIG. 10). The valve 81 is open. The control medium is fed via the valve actuating piston 41, as described with reference to the previous embodiment, in order to displace the injector needle 2 into its open position.

In order to start the injection process, the magnetic drive 42 is switched on, such that the valve actuating piston 41 is pushed back via the magnetic armature 43 against the force of the compression spring 44. This causes the valve 81 to close in the manner described (FIG. 11). As such, a pressure builds up in the intermediate chamber 59 via the supply line 60, which acts on the guide part 31 of the piston 26. This pressure is greater than the counterforce of the piston spring 11, such that the piston 26 is displaced axially. This also causes the injector needle 2, which is axially fixedly connected to the piston 26, to be displaced axially into the open position shown in FIG. 11, in which the valve plate 3 releases the nozzle opening 4.

To end the blowing-in process, the magnetic drive 42 is switched off, causing the valve actuating piston 41 to be displaced axially back into its closed position via the magnetic armature 43, in which it displaces the valve plate 86 of the valve 82 into its closed position in accordance with FIG. 10. Thereby, valve 81 is opened simultaneously in the manner described, such that the pressure of the control medium in the intermediate chamber 59 can be relieved.

The two valve tappets 97, 86*a* of the valves 81,82 are connected to one another inside the bore 80 of the valve block 79 by a spacer pin 153, via which the movement of one is transmitted to the other valve tappet.

Then, the piston spring 11 pushes the piston 26 with the injector needle 2 back so far that the valve plate 3 closes the nozzle opening 4 (FIG. 10).

Figure 12:
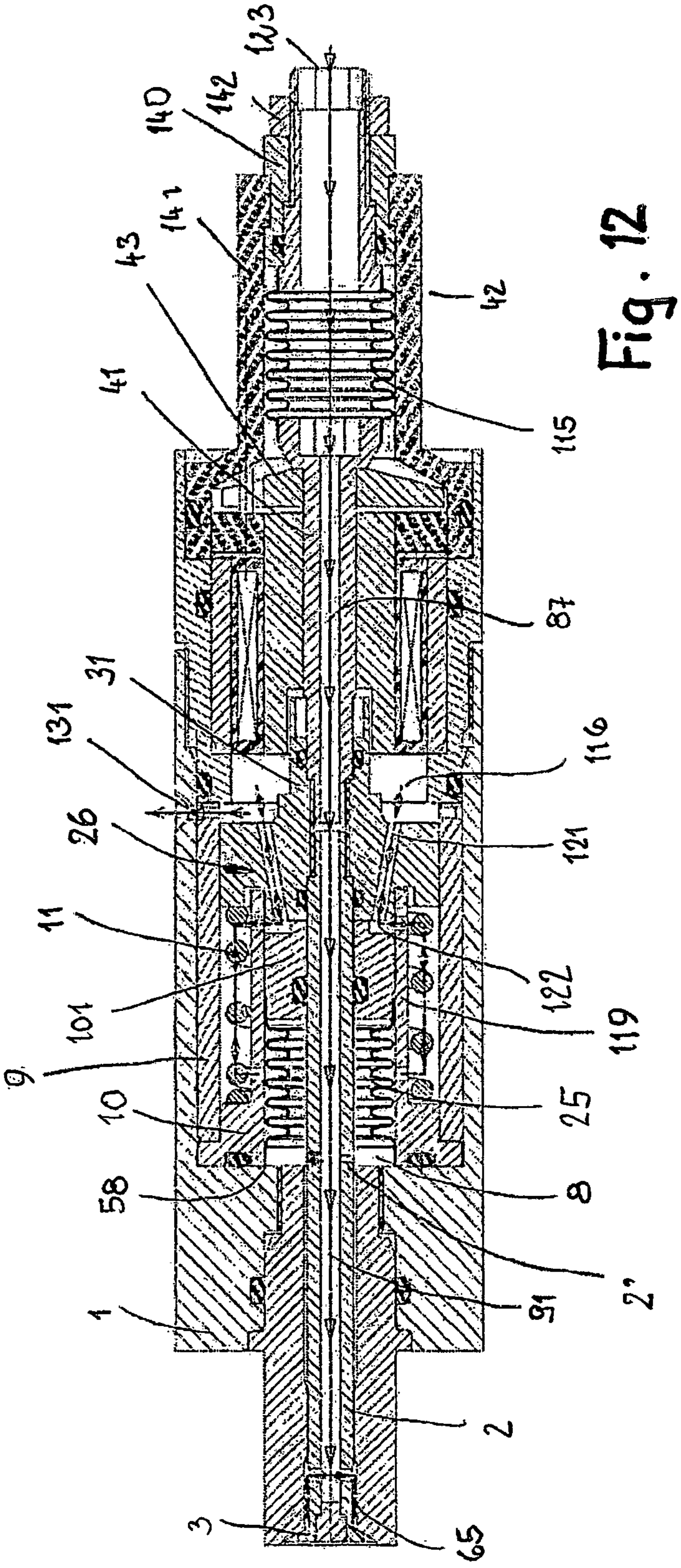
FIG. 12 shows, in axial section, an eighth embodiment of a gas injector in the closed state.
Figure 13:
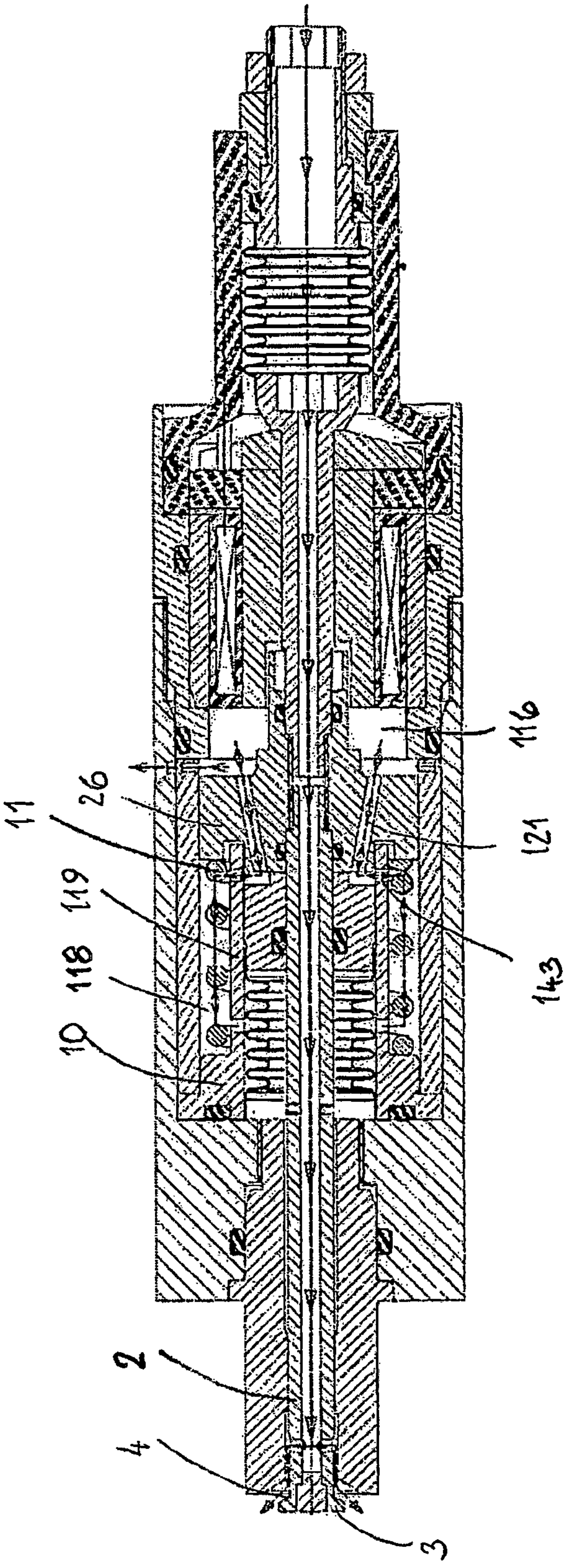
FIG. 13 shows the gas injector in accordance with FIG. 12 in the open state.

FIGS. 12 and 13 show a directly controlled gas injector. The injector needle 2 is designed as a hollow needle and has the axial bore 91, which is aligned with the axial bore 87 of the actuating piston 41, on which the magnet armature 43 is axially fixedly arranged.

The axial bore 87 of the actuating piston 41 is connected to the pressure port 123, through which the gas is fed. It flows in the direction of the arrows drawn in FIGS. 12 and 13 through the axial bores 87, 91 into the nozzle chamber 65, which is closed by the valve plate 3 of the injector needle 2.

The actuating piston 41 and the injector needle 2 are screwed with their ends into the guide part 31 of the piston 26 or into the piston 26. Inside the piston 26, the injector needle 2 and the actuating piston 41 are sealed by corresponding seals.

The actuating piston 41 is fastened in a housing part 141 of the magnetic drive 42 by means of a clamping nut 142 with the interposition of a sealing sleeve 140.

The injector needle 2 is surrounded in the region between the compensation piston 101 and the base 58 of the receiving chamber 8 by the bellows 25, which is arranged inside the sleeve 10. The receiving chamber 8 is flow-connected to the axial bore 91 of the injector needle 2 via at least one cross bore 2'.

The compensation piston 101 directly rests against the piston 26, as has been described with reference to FIGS. 10 and 11. The annular chamber 122 is connected to the annular chamber 116 via the bores 121 The bores 121 enable pressure equalization between the two annular chambers 116, 122.

The annular chamber 116 is connected to the tank port 131, or to the atmosphere, so that no pressures are created by temperature changes in the gas injector.

The piston 26 is under the force of the piston spring 11, which is located in the annular chamber between the valve housing 9 and the sleeve section 119 of the sleeve 10. The piston spring 11 is axially supported on the base 58 of the housing 1 via the sleeve 10.

The bellows 115 is arranged inside the housing part 141, which together with the bellows 25 leads to a proper sealing of the injector to the outside. The bellows 115 is tightly connected to the valve actuating piston 41 and follows its stroke movement.

To perform a blowing-in process, the magnetic drive 42 is switched on, causing the valve actuating piston 41 to be displaced axially via the magnetic armature 43. This also causes the piston 26 to be displaced axially against the force of the piston spring 11, thereby taking the compensation piston 101 with it. Since the injector needle 2 is also axially fixedly connected to the piston 26, the injector needle 2 is displaced to the position shown in FIG. 13, in which the valve plate 3 releases the nozzle opening 4. The bores 121 ensure that the piston 26 can be reliably displaced. The sleeve section 119 of the sleeve 10 is provided with corresponding openings 143, such that the two annular chambers 118 and 116 are connected to one another via the bores 121.

In order to end the blowing-in process, the magnetic drive 42 is switched off. Then, the piston spring 11 can push the piston 26 back again. This also pushes the injector needle 2, which is axially fixedly connected to the piston 26, back to its closed position in accordance with FIG. 12, in which the valve plate 3 closes the nozzle opening 4.

This pilot operated design of the gas injector is well suited for lower pressures, at which the gas is to be blown into the combustion chamber. In such a case, the magnetic forces are sufficient in order to attract the magnetic armature 43 and thereby displace the valve actuating piston 41.

Figure 14:
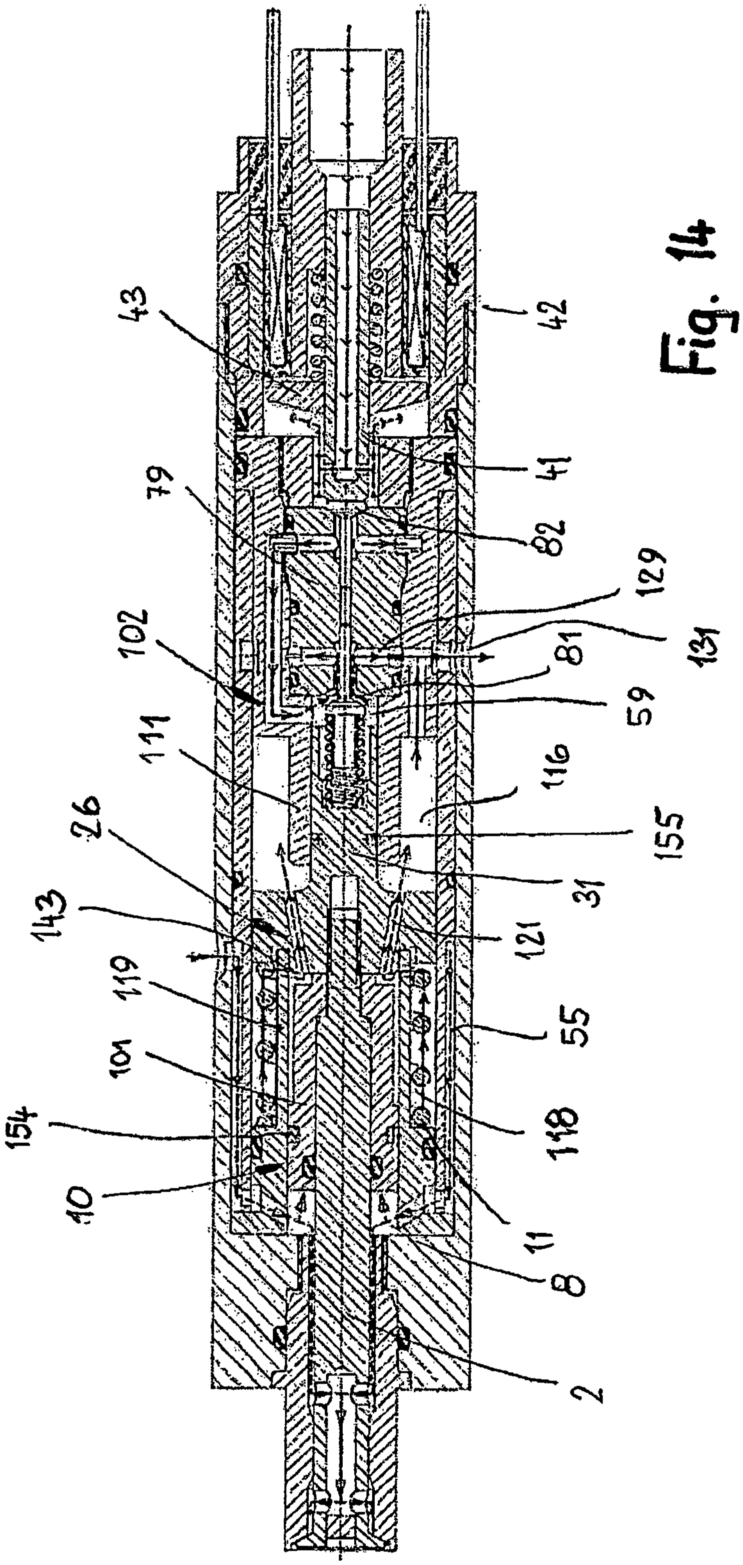
FIG. 14 shows, in axial section, a ninth embodiment of a gas injector in the closed state.
Figure 15:
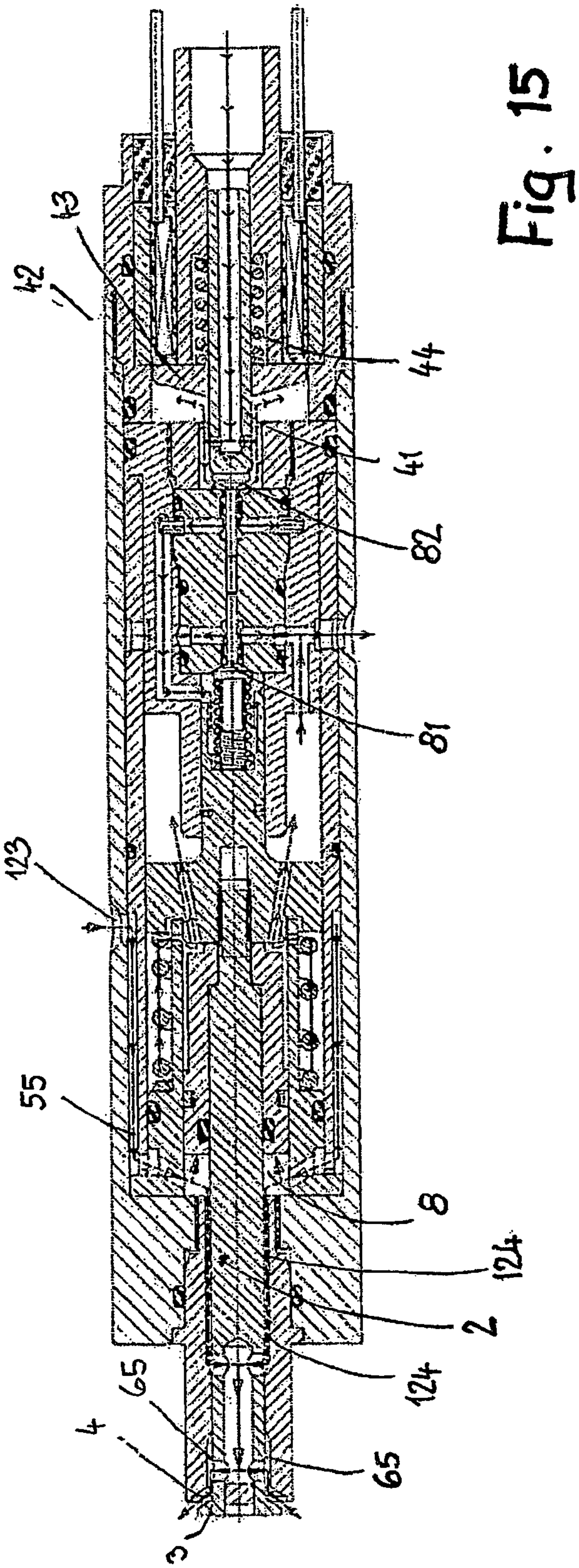
FIG. 15 shows the gas injector in accordance with FIG. 14 in the open state.

The gas injector in accordance with FIGS. 14 and 15 has a similar design to the gas injector according to FIGS. 6 and 7. With this exemplary embodiment, the bellows of FIGS. 6 and 7 are not provided. The compensation piston 101 rests sealed against the inner side of the sleeve 10. The annular chamber 118, which accommodates the piston spring 11, is connected to the annular chamber 116 via the bores 121 in the piston 26.

The attachment 113 of the housing part 102 is designed to be substantially longer than with the exemplary embodiment according to FIGS. 6 and 7. As a result, the guide part 31 of the piston 26 is guided by the attachment 111 over most of its length.

The piston rings 154, 155, which are advantageously made of metal, are used to seal the piston 26 with respect to the housing part 102 and the compensation piston 101 with respect to the sleeve 10. Higher pressures may be realized with such piston rings than with bellows.

In order to start the blowing-in process, the magnetic drive 42 is switched on, causing the valve actuating piston 41 to be pushed back via the magnetic armature 43. As a result, the valve 82 is opened in the manner described, while the axially opposite valve 81 is closed. This allows the pressure of the control medium to build up in the intermediate chamber 59 and axially load the piston 26, such that it is displaced together with the compensation piston 101 and the injector needle 2. The valve plate 3 of the injector needle 2 releases the nozzle opening 4, such that the gas fed via the pressure port 123 can flow into the nozzle chamber 65 via the annular line 55, the receiving chamber 8 and the annular line 124.

In order to end the blowing-in process, the magnetic drive 42 is switched off, causing the magnetic armature 43 and with it the valve actuating piston 41 to be pushed back. This closes the valve 82 in the manner described and opens the opposite valve 81. This allows the piston spring 11 to push the piston 26 back, wherein the control medium located in the intermediate chamber 59 is displaced to the tank port 131 via the cross bore 129 in the valve block 79 in the manner described.

By pushing back the piston 26 and thus also the compensation piston 101, the injector needle 2 is displaced to its closed position shown in FIG. 14.

The gas injector in accordance with FIGS. 16 to 19 has substantially the same design as the embodiment according to FIGS. 6 and 7. The difference is that the valves 81 and 82 each have a valve ball 83, 86 instead of the plate-shaped valve element 83, 86.

Figure 16:
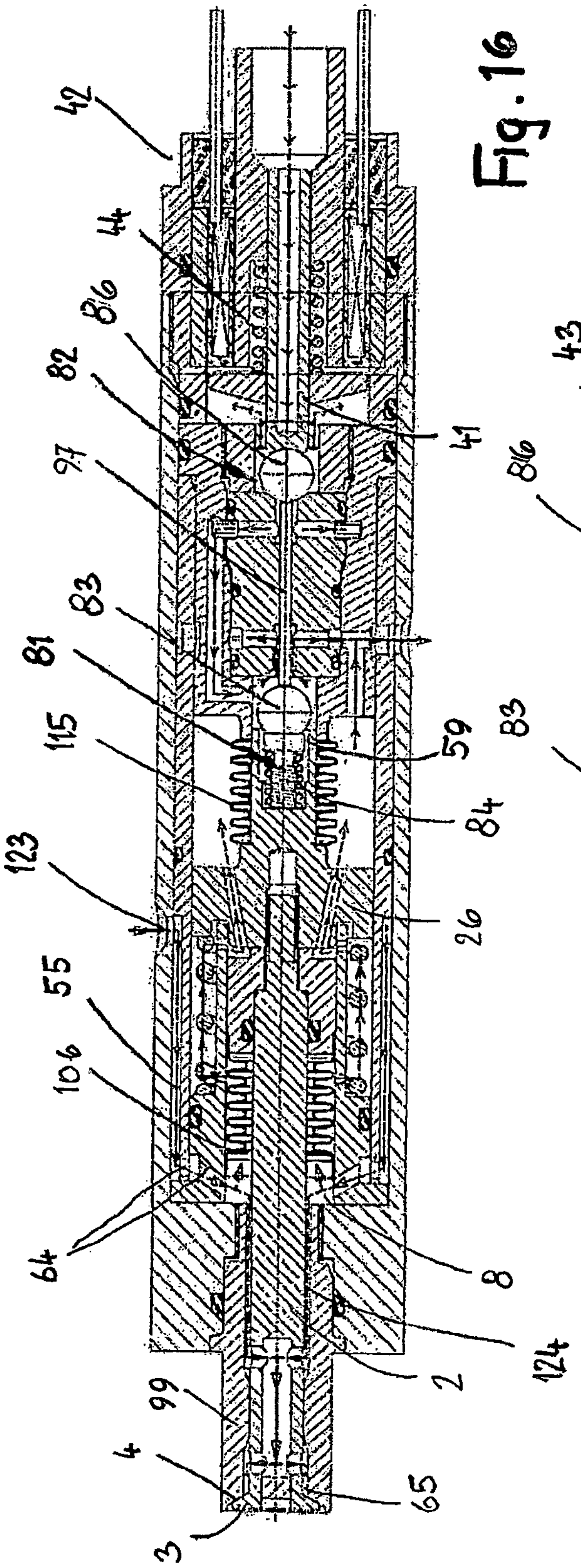
FIG. 16 shows, in axial section, a tenth embodiment of a gas injector in the closed state.
Figure 17:
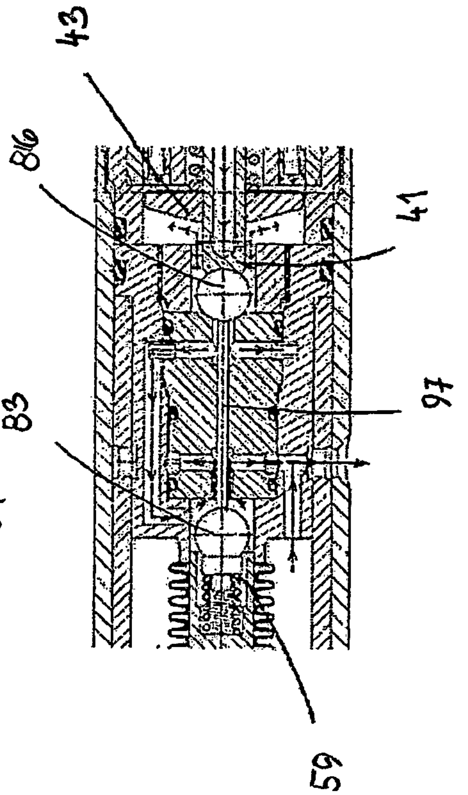
FIG. 17 shows, in enlarged representation, a section of FIG. 16.
Figure 18:
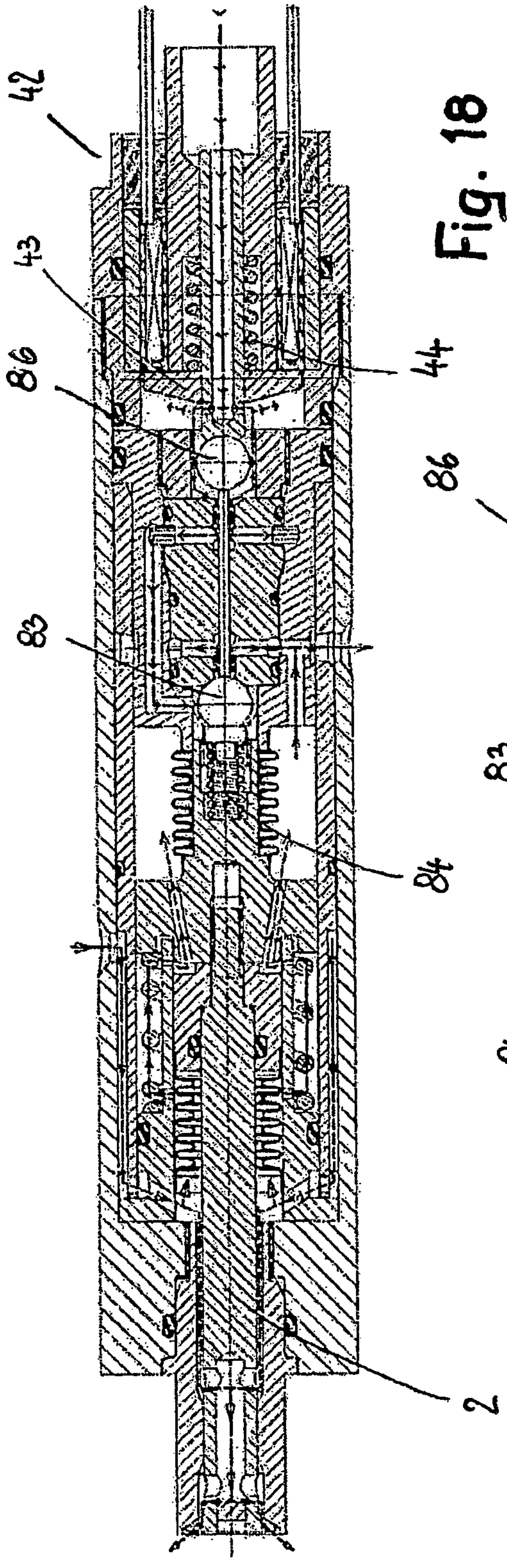
FIG. 18 shows the gas injector in accordance with FIG. 16 in the open state.
Figure 19:
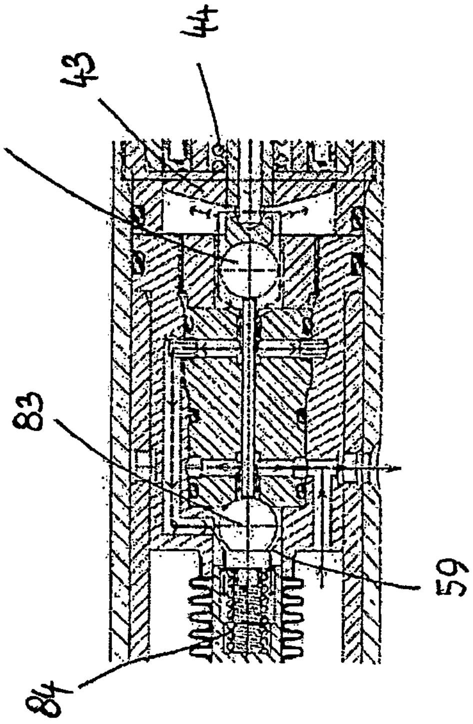
FIG. 19 shows in enlarged representation, a section of FIG. 18.

FIGS. 16 and 17 show the injector needle 2 in the closed position, in which its valve plate 3 closes the nozzle opening 4. The magnetic drive 42 is switched off, such that the valve actuating piston 41 presses the valve ball 86 into its closed position under the force of the compression spring 44. The valve tappet 97 adjusts the valve ball 83 of the valve 81 to the open position against the force of the valve spring 84.

The gas is conveyed under pressure via the pressure port 123 through the bores 55, 64, the receiving chamber 8 and the line 124 into the nozzle chamber 65 of the nozzle 99.

In order to initiate the blowing of gas into the combustion chamber, the magnetic drive 42 is switched on, causing the magnetic armature 43 to be pushed back against the force of the compression spring 44. This allows the valve spring 84 to adjust the valve ball 83 to its release position, wherein the valve ball 86 is adjusted to the open position by the valve tappet 97. Then, as has been described with reference to the exemplary embodiment according to FIGS. 6 and 7, it is possible that due to the pressure building up in the intermediate chamber 59, the piston 26 and thus also the injector needle 2 are displaced into the release position in accordance with FIGS. 18 and 19.

Figure 20:
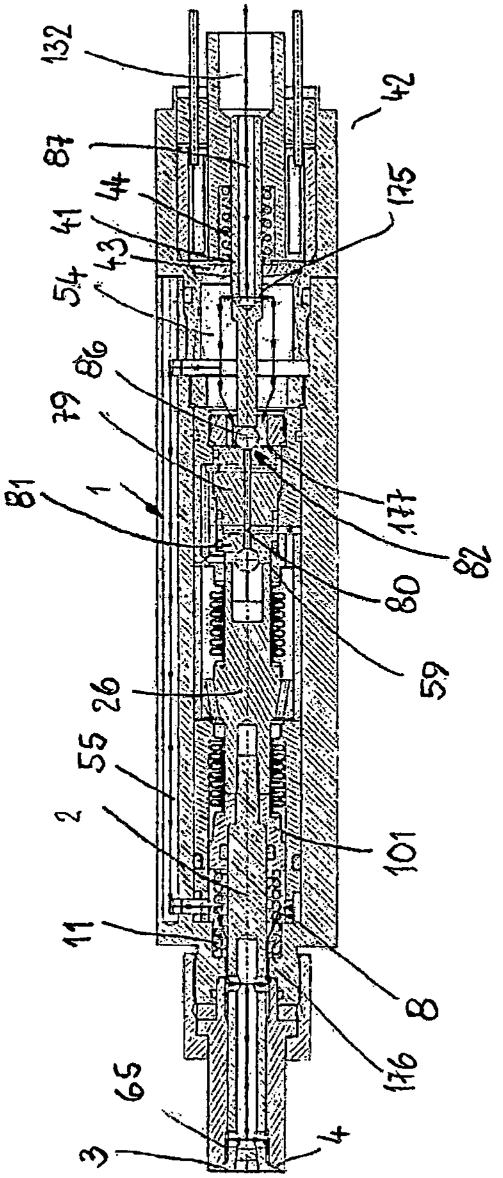
FIG. 20 shows, in axial section, a tenth embodiment of a gas injector in the closed state.

FIG. 20 shows a gas injector of, in principle, the same design as the embodiment in accordance with FIGS. 16 to 19. The difference is substantially that the gas to be blown in is used to actuate the injector needle 2. This eliminates the need for an additional pressure port in the housing 1. The gas to be blown in is fed through the control port 132, which is axially fed through the bore 87 of the valve actuating piston 41. It has a cross bore 175, through which the gas enters the medium chamber 54. From here, a part of the gas can enter the bore 55 in the housing 1, through which the gas can flow into the receiving chamber 8. From here, as has been described with reference to FIGS. 6 and 7, the gas enters the nozzle chamber 65, which is closed by the valve plate 3 in the closed position.

The piston spring 11 is located in the receiving chamber 8, which piston spring is supported with one end on the housing 1 and with its other end on the end face of the compensation piston 101. The piston spring 11 surrounds the part of the injector needle 2 that protrudes axially over the compensation piston 101.

Since the piston spring 11 is accommodated in the receiving chamber 8 and surrounds the injector needle 2 at a small distance, the outer diameter of the housing 1 can be kept small.

The housing 1 has a radially inwardly protruding radial flange 176 for axial support of the piston spring 11.

The gas in the medium chamber 54 flows to the end face 177 of the valve block 79, as shown by the drawn flow arrows.

In the closed position shown, the valve actuating piston 41 pushes the valve ball 86 to its closed position.

The piston spring 11 loads the compensation piston 101 and thus also the piston 26 together with the injector needle 2 in the direction of the magnetic drive 42, causing the valve plate 3 to close the nozzle opening 4.

In order to blow the pressurized gas fed through the control port 132 into the combustion chamber, the magnetic drive 42 is switched on, causing the valve actuating piston 41 to be pushed back by means of the magnetic armature 43 and the valve ball 86 to be adjusted to its release position under the pressure of the pressure prevailing in the bore 80 of the valve block 79. This allows the gas to enter the intermediate chamber 59 through the open valve 82 in the manner described, causing the piston 26 to be pressurized and it to be displaced against the force of the piston spring 11. The valve plate 3 is moved to its open position via the compensation piston 101 and the injector needle 2. Then, the gas from the nozzle chamber 65 under pressure enters the combustion chamber of the engine.

In order to end the blowing-in process, the magnetic drive 42 is switched off, causing the magnetic armature 43 to be displaced by the compression spring 44 and thus the valve actuating piston 41. The valve 82 is thus closed, while the opposite valve 81 is opened. The intermediate chamber 59 is thus relieved, such that the piston spring 11 can push back the compensation piston 111 with the piston 26 and the injector needle 2 and thus adjust the valve plate 3 to its closed position.

To achieve an optimum blowing-in result, the nozzle opening can be designed differently. Depending on the desired results of the mixing of gas and air, the nozzle designs are designed differently. One parameter is the penetration depth of the gas jet into the combustion chamber. For this purpose, the highest possible flow velocities are advantageous. They can be equal to or greater than the speed of sound. Thereby, the gas should be blown in vertically in the axial direction of the combustion chamber.

Figure 21:
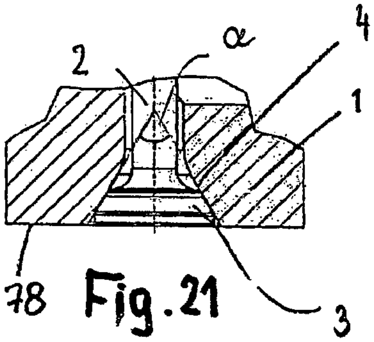
FIGS. 21 to 31 show, each in enlarged representation and in section, different embodiments of nozzles of the gas injector.

FIG. 21 shows a nozzle opening 4 with an opening angle $\alpha$ of approximately 60°. Thereby, the nozzle opening 4 is designed in such a manner that it widens continuously in the direction of blowing in. In the closed position shown, the valve plate 3 is located inside the nozzle opening 4 and is adjusted outward into the combustion chamber by means of the injector needle 2 to open the nozzle opening 4.

The conical wall of the nozzle opening 4 extends to the end face 78 of the housing 1.

Such a design of the nozzle results in a large blowing-in depth of the gas into the combustion chamber.

Figure 34:
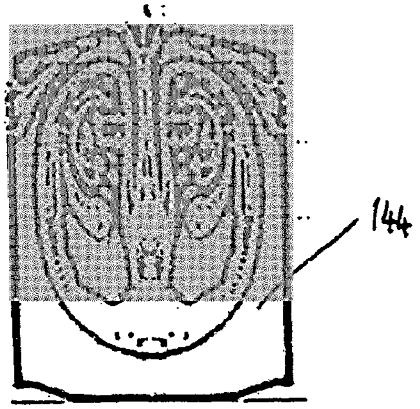

FIG. 34 shows the distribution pattern of the blown-in gas resulting in the combustion chamber 144 by means of a nozzle design in accordance with FIG. 21. It can be seen that a very large blowing-in depth is achieved, causing the combustion chamber 144 to be optimally filled with the gas.

Figure 22:
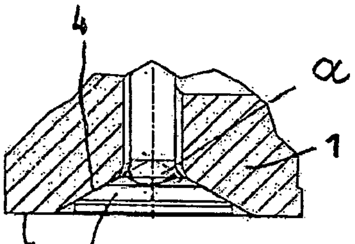

With the embodiment in accordance with FIG. 22, the nozzle opening 4 has an opening angle $\alpha$ of 120°. As with the previous embodiment, the opening wall extends to the end face 78 of the housing 1.

The valve plate 3 is also displaced into the combustion chamber to open the valve.

Figure 32:
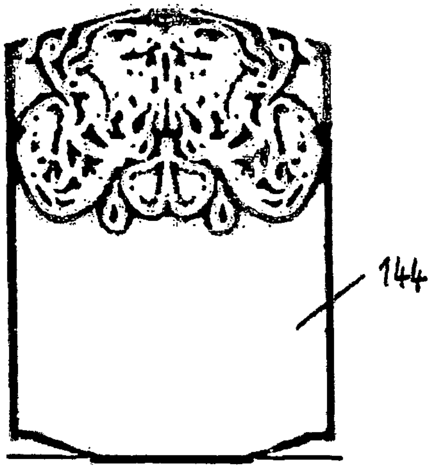
FIGS. 32 to 35 show, in schematic representation, different jet paths of the gas to be blown into the combustion chamber at different nozzle angles.

The associated flow pattern is shown in FIG. 32. The gas spreads mainly in the upper region of the combustion chamber 144.

Whereas, with the designs in accordance with FIGS. 21 and 22, the valve plate 3 in the closed position is located with its end face flush with the end face 78 of the housing 1, this is not the case with the exemplary embodiments described below.

Figure 23:
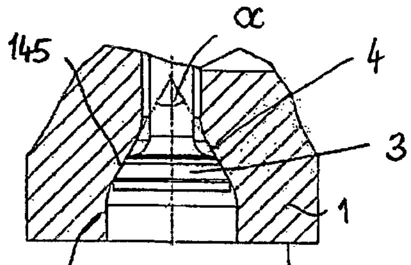

The nozzle design in accordance with FIG. 23 is characterized in that the nozzle opening 4 has a cylindrical section 146 adjoining the tapered section 145, which cylindrical section extends to the end face 78 of the housing 1. The tapered section 145 in turn has the opening angle $\alpha$ of 60°.

In the closed position, the valve plate 3 rests in a sealing manner against the tapered section 145 and is thus at a distance from the end face 78 of the housing 1.

The cylinder section 146 forms a cylindrical nozzle gap forming a jet guide for the gas to be blown in. The cylinder section 146 can be used to affect both the penetration depth into the combustion chamber 144 and the dispersion of the gas inside the combustion chamber 144.

Figure 24:
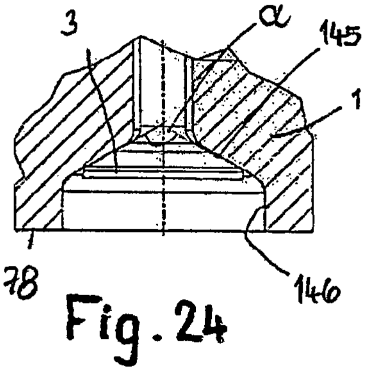

FIG. 24 shows a nozzle design with which the tapered section 145 is adjoined by the cylinder section 146, which extends to the end face 78 of the housing 1. The tapered section 145 has the opening angle α of 120°. The cylinder section 146 can be used to increase the blowing-in depth of the gas into the combustion chamber 144, such that, in contrast to the embodiment according to FIG. 22, the lower region of the combustion chamber 144 can also be filled with the gas.

In the closed position, the valve plate 3 is in turn at a distance from the end face 78.

Figure 25:
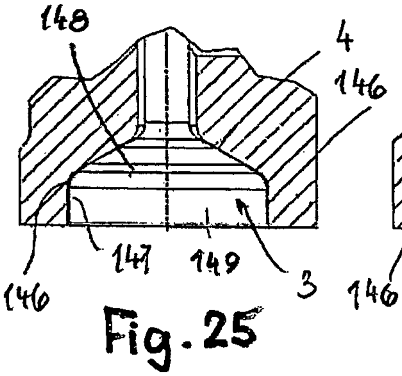

FIG. 25 shows an exemplary embodiment with which the valve plate 3 is adjusted downward into the combustion chamber 144 to open the nozzle opening 4. In the closed position, the end face of the valve plate 3 is flush with the end face 78, similar to the embodiment according to FIGS. 21 and 22. In all other respects, the nozzle opening 4 is of the same design as with the exemplary embodiment according to FIG. 24.

The valve plate 3 has a cylindrical end section 149 that is adjoined to the conical section 148.

Figure 33:
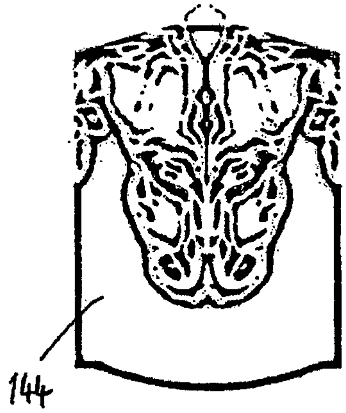

With a nozzle design corresponding to FIGS. 24 and 25, a jet pattern in accordance with FIG. 33 is obtained. A comparison with FIG. 32 shows that, as a result of the cylinder section 146, the gas can be blown deeper into the combustion chamber 144.

Figure 26:
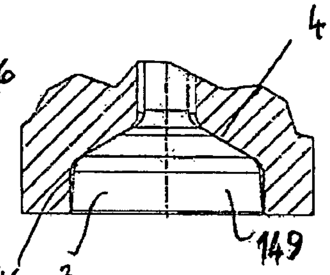

With the exemplary embodiment according to FIG. 26, the nozzle opening 4 has the same design as with the exemplary embodiments according to FIGS. 24 and 25.

The valve plate 3 has a similar design as with the exemplary embodiment according to FIG. 25. While, with the embodiment according to FIG. 25, the end section 149 of the valve plate 3 is cylindrical, the end section 149 of the spring plate 3 in accordance with FIG. 26 has a slightly conical design and widens in the direction of its free end. As a result, a Venturi effect can be achieved during the blowing-in process, which has a favorable effect on the penetration depth of the gas into the combustion chamber 144.

Figure 27:
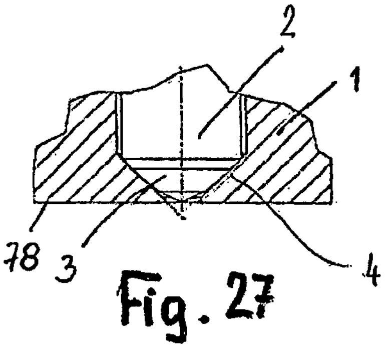

With the embodiment according to FIG. 27, the injector needle 2 has a conically tapering end, which forms the valve element 3. The nozzle opening 4 tapers conically in the direction of the end face 78 of the housing 1. To release the nozzle opening 4, the injector needle 2 is retracted inward, thus does not enter the combustion chamber 144.

The opening angle of the nozzle opening 4 amounts to approximately 90°.

Figure 28:
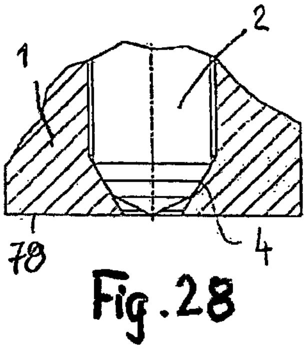

The nozzle design in accordance with FIG. 28 is characterized by the fact that the opening angle of the nozzle opening 4 is 60°, wherein the nozzle opening 4 tapers in the direction of the end face 78 of the housing 1 in accordance with the previous embodiment.

The injector needle 2 is retracted to open the nozzle opening 4.

Figure 35:
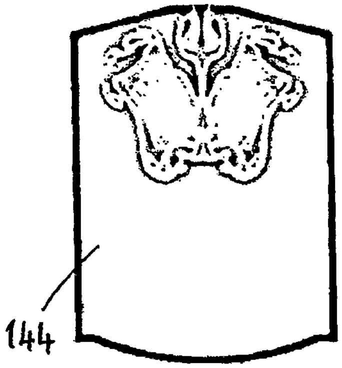

FIG. 35 shows the jet pattern produced during the blowing-in process.

Figure 29:
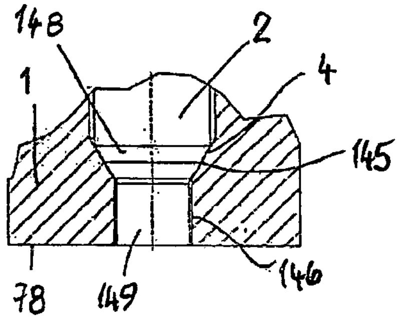
Figure 30:
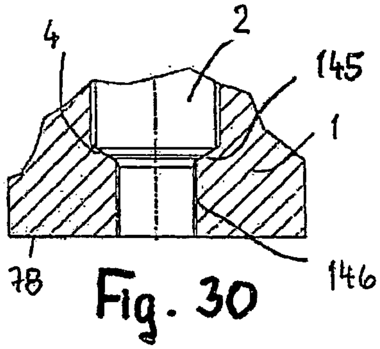

With the embodiments according to FIGS. 29 and 30, the tapered section 145 of the wall of the opening 4 is adjoined by the cylindrical section 146, which extends to the end face 78 of the housing 1. In contrast to the embodiments according to FIGS. 24 to 26, with which the tapered section 145 and the cylinder section 146 are approximately the same length in the axial direction of the injector needle 2, the cylinder section 146 is axially longer than the tapered section 145.

The tapered section 145 tapers in the direction of the end face 78 and has an opening angle of 60° (FIG. 29) or 120° (FIG. 30).

The injector needle 2 is provided with the cylindrical end region 149 that, in the closed position, is located inside the cylindrical section 146 of the nozzle opening 4. The seal is effected in the region of the tapered section 145 with the conical section 148 of the injector needle 2. The cylindrical end region 149 forms with the cylindrical section 146 of the opening wall the ring-shaped nozzle gap for the gas to be blown in if the injector needle 2 is retracted inward.

With the exemplary embodiment according to FIG. 30, the opening angle of the tapered section 145 is 120°. The axial length of the tapered section 145 is substantially smaller than with the previous embodiment and substantially smaller than the axial length of the cylinder section 146, which in turn extends to the end face 78 of the housing. In all other respects, the nozzle design is the same as with the embodiment according to FIG. 29. The injector needle 2 is retracted to open the nozzle opening 4.

Figure 31:
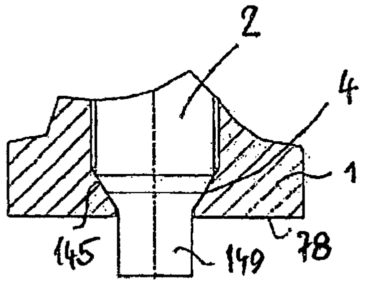

With the exemplary embodiment according to FIG. 31, the nozzle opening 4 has only the tapered section 145, which has an opening angle of 60° and tapers in the direction of the end face 78 of the housing 1. The cylindrical end region 149 projects beyond the end face 78 for nearly its entire length in the closed position and is used to guide the jet upon the blowing of the gas into the combustion chamber 144.

FIGS. 36 to 39 show various possibilities in which the amount of gas blown into the combustion chamber 144 can be set by setting the nozzle gap.

Figure 36:
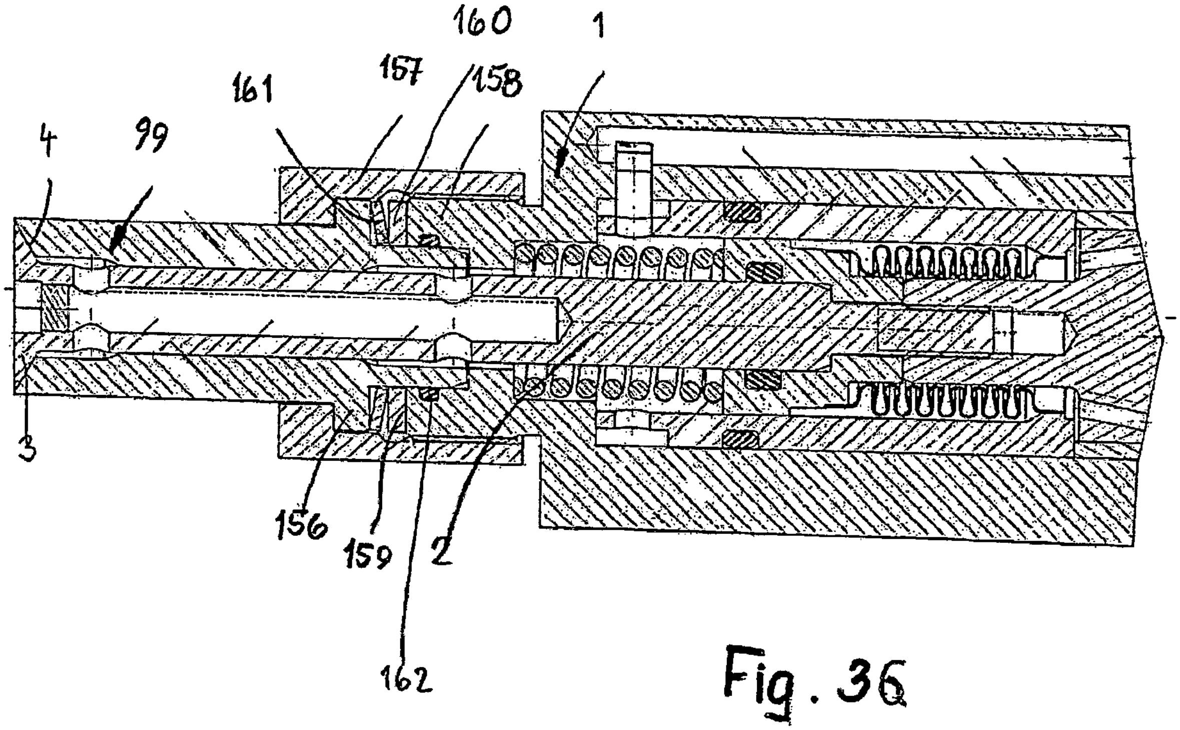
FIG. 36 shows, in enlarged representation and in axial section, a part of the gas injector in accordance with FIGS. 6 and 7 with a device for setting the nozzle gap.
Figure 37:
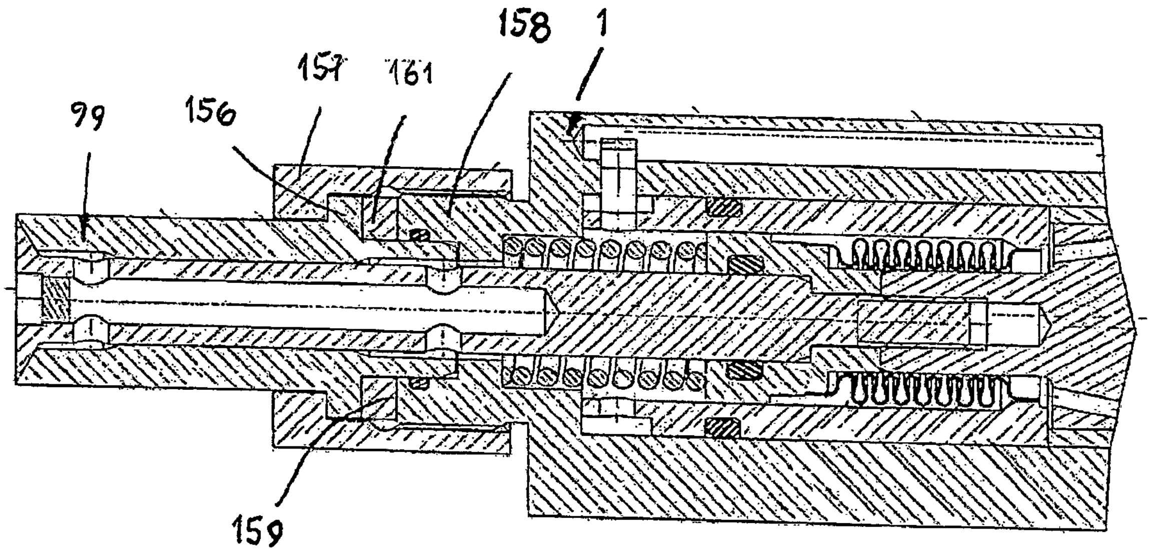
FIG. 37 shows a further possibility of setting the nozzle gap in an illustration corresponding to FIG. 36.

The gas injector in accordance with FIGS. 36 and 37 corresponds to the gas injector in accordance with FIGS. 6 and 7. FIGS. 36 and 37 show the corresponding nozzle end in more detail. The injector needle 2 extends into the nozzle 99, which protrudes axially beyond the housing 1. The nozzle 99 has the nozzle opening 4, which can be closed by the valve plate 3 of the injector needle 2 in the closed position.

The nozzle 99 has an outwardly projecting radial flange 156 over which a setting nut 157 engages. It is screwed onto an axial annular projection 158 of the housing 1. A setting disk 160 for coarse setting of the nozzle gap and a setting disk 161 for fine setting are located between the radial flange 156 and the end face 159 of the projection 158.

Both setting disks 160, 161 are seated on the nozzle 99, which is sealed against the projection 158 of the housing 1 by an annular seal 162.

A coarse setting of the nozzle gap is effected with the setting disk 160, which rests against the end face 156 of the projection 158. The thickness of such setting disk 160 initially coarsely determines the size of the nozzle gap. By means of the setting nut 157, the setting disk 161, which is advantageously a plate spring, is elastically deformed axially when screwed onto the projection 158 of the housing 1, wherein the setting disk 160 is supported on the annular flange 156 as well as on the setting disk 160.

With the embodiment in accordance with FIG. 36, the gas injector opens to the outside into the combustion chamber, as explained by way of example based on FIGS. 6 and 7. The setting nut 157 permits very sensitive elastic deformation of the setting disk 161, such that the distance between the nozzle 99 and the injector needle 2 in the axial direction can be finely set during installation of the gas injector. The spring-loaded setting disk 161 allows adjustment in the μm range.

The calibration of the injector flow takes place on the test bench, while a flow of the gas takes place at the nozzle.

Figure 40:
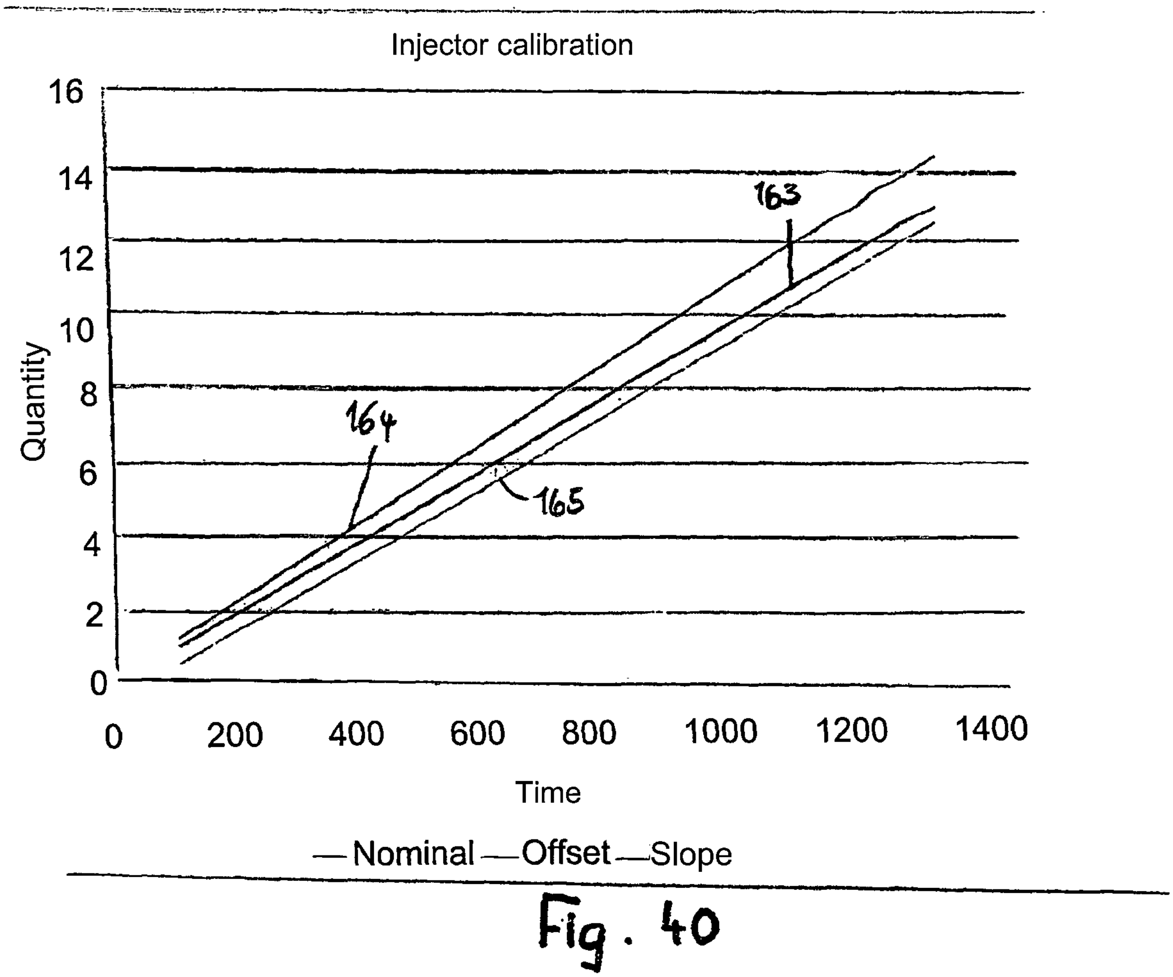
FIG. 40 shows, in a diagram, the injector calibration performed with the aid of the setting of the nozzle gap.

Thereby, by turning the setting nut 157, the nozzle gap is set such that the desired flow is achieved. Then, the gas injector is calibrated and has the required accuracy for the gas quantity to be blown into the combustion chamber of the engine. FIG. 40 shows the calibration curves of the gas injector by way of example.

The characteristic curve 163 is, by way of example, the nominal characteristic curve. The other two characteristic curves 164 and 165 show, by way of example, characteristic curves of measured gas injectors that deviate from the nominal characteristic curve 163.

The characteristic curve 165 has the same gradient as the nominal characteristic curve 163, such that, by means of the setting nut, the nozzle 99 can be set relative to the injector needle 2 such that the characteristic curve 165 coincides with the nominal characteristic curve 163.

The other exemplary characteristic curve 164 has a slope that differs from the slope of the nominal characteristic curve 163. This difference in slope can be stored as barcode information on the gas injector, for example. When the gas injector is installed in the combustion engine, the barcode is read out and passed on to the engine control system. Thus, the gas quantity to be blown in can be set via the control system, such that it corresponds to the required gas quantity despite the deviating characteristic curve 164.

Based on this design, the production of the gas injector is very simple without impairing the desired accuracy with regard to the intake quantity.

With the embodiment in accordance with FIG. 37, the setting disk 161 is plastically deformable. It is axially deformed by means of the setting nut 157 between the radial flange 156 of the nozzle 99 and the end face 159 of the axial projection 158 of the housing 1.

Figure 38:
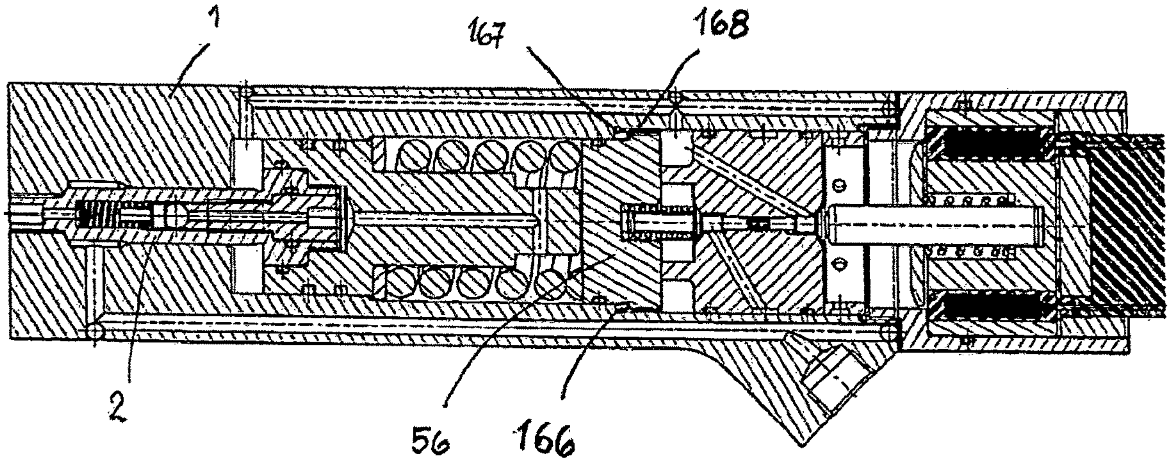
FIGS. 38 and 39 show, in representations corresponding to FIG. 36, further embodiments of gas injectors with a device for setting the nozzle gap.

FIG. 38 shows the possibility of providing the setting of the nozzle jet with a gas injector, whose injector needle 2 opens inward, as well. This gas injector corresponds to the embodiment according to FIGS. 4 and 5. To set the desired gas flow, at least one elastic or plastic setting element 166 is used, which setting element is designed as a ring and is axially deformed by the valve clamping nut 56. The setting element 166 is located between a ring-shaped shoulder 167 on the inner side of the housing 1 and a radially outer annular shoulder 168 of the valve clamping nut 56. Depending on the flow rate to be set, the valve clamping nut 56 is screwed into the housing 1 to different extents, wherein the setting element 166 is deformed axially accordingly.

Figure 39:
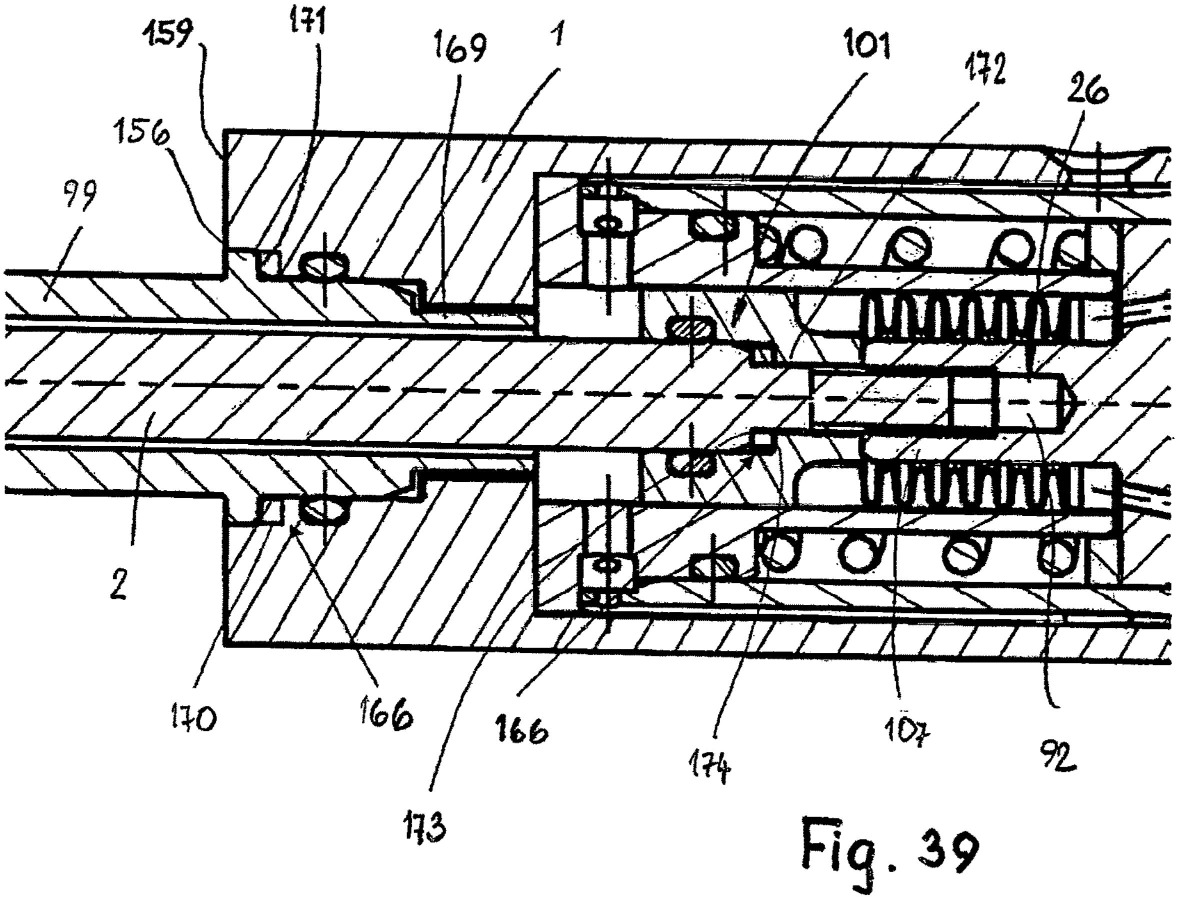

FIG. 39 shows by way of example that the flow rate can also be adjusted by adjusting the nozzle 99 and the injector needle 2 accordingly. The gas injector is designed in a manner corresponding to FIGS. 6 and 7. The nozzle 99 is screwed into the housing 1 with its end section 169 reduced in diameter. The nozzle 99 has the radial flange 156, which is located in a central recess 170 in the end face 159 of the housing 1. The ring-shaped setting element 166, which can be plastically or elastically axially deformable, is located between the base 171 of the recess 170 and the radial flange 156. When screwing in the nozzle 99, the axial position of the nozzle 99 relative to the housing 1 can be precisely set by corresponding deformation of the setting element 166.

A further ring-shaped setting element 166 is provided between the injector needle 2 and the compensation piston 101. The compensation piston 101 has a stepped through bore 172, through which the injector needle 2 projects. It is screwed with its free end into the axial bore 92 of the piston 26.

The injector needle 2 and the through bore 172 each have a radial shoulder 173, 174, between which the ring-shaped setting element 166 is located. It is deformed axially when the injector needle 2 is screwed into the piston 26 or its attachment 107. In this manner, depending on the degree of axial deformation, the position of the injector needle 2 in the axial direction can be set.

Figure 41:
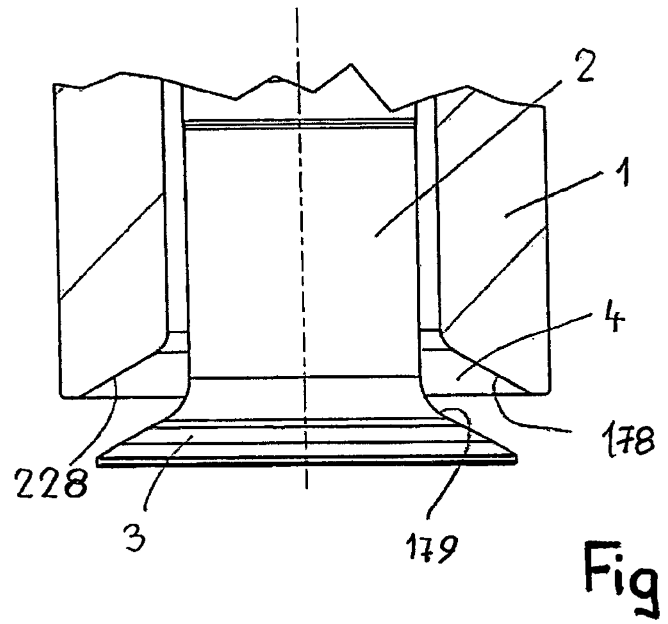
FIG. 41 shows, in enlarged representation, an embodiment of a coating of the injector needle.

FIG. 41 shows by way of example the possibility of coating the surface in the nozzle outlet region. The injector needle 2 has the valve plate 3, which is located in its open position, such that the gas can exit into the combustion chamber of an internal combustion engine in the manner described. The nozzle opening 4 in the housing 1 widens conically in the direction of the free end. The conical wall 228 of the nozzle opening 4 has a coating 178, which covers the entire upper side of the conical wall 228. Such coating can also be provided for the valve block 79 (FIGS. 4 and 5) and its valve seats.

Advantageously, the valve plate 3 is also provided with a coating 179 on its upper side, which coating completely covers the cone wall of the valve plate 3.

The coating 179 of the valve plate 3 serves as wear protection and can be formed by carbon (DLC) or by tungsten carbide layers, for example. The coating 178 on the nozzle opening wall 228 is particularly advantageous with respect to dry running. The coating 178 also forms an additional wear protection and can, for example, be made of tungsten carbide, of DLC or of another suitable material.

Figure 42:
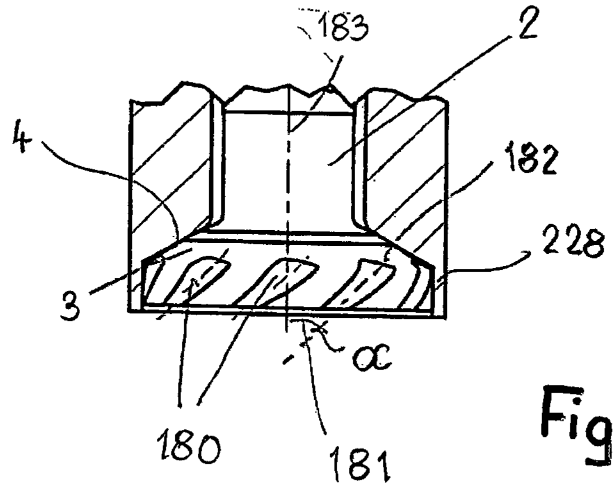
FIG. 42 shows, in enlarged representation, a swirl structure on the injector needle.

FIG. 42 shows by way of example the possibility of feeding the gas into the combustion chamber of the internal combustion engine in a targeted manner. For this purpose, the injector needle 2 is provided with a swirl structure 180 in the region of the valve plate 3. In principle, the swirl structure 180 can also be provided in the wall 228 of the nozzle opening 4. The swirl structure 180 is designed in such a manner that the gas is caused to swirl when it enters the combustion chamber and can thus be better mixed with the air in the combustion chamber. This results in better homogenization of the fuel-air mixture.

The swirl structure 180 is provided around the circumference of the valve plate 3 or the wall 228 and is formed by grooves that are at a distance from one another, which extend from an end face 181 of the valve plate 3. Advantageously, the grooves extend over more than half the axial height of the valve plate 3 or the wall 228 of the nozzle opening 4. The grooves are elongated and arranged such that their center lines 182 include an acute angle $\alpha$ with the axis 183 of the injector needle 2, viewed in the radial direction in accordance with FIG. 42.

If the nozzle opening 4 is released by the valve plate 3, the gas flows in the manner described through the annular gap between the valve plate 3 and the wall of the nozzle opening 4 into the combustion chamber. The swirl structure 180 ensures that the gas is caused to swirl if it enters the combustion chamber. The swirl angle $\alpha$ depends on the desired swirl effect and the incoming fresh air. The desired swirl effect can thus be set by corresponding design of the swirl structure 180, also for example by corresponding shaping of the grooves of the swirl structure.

Figure 43:
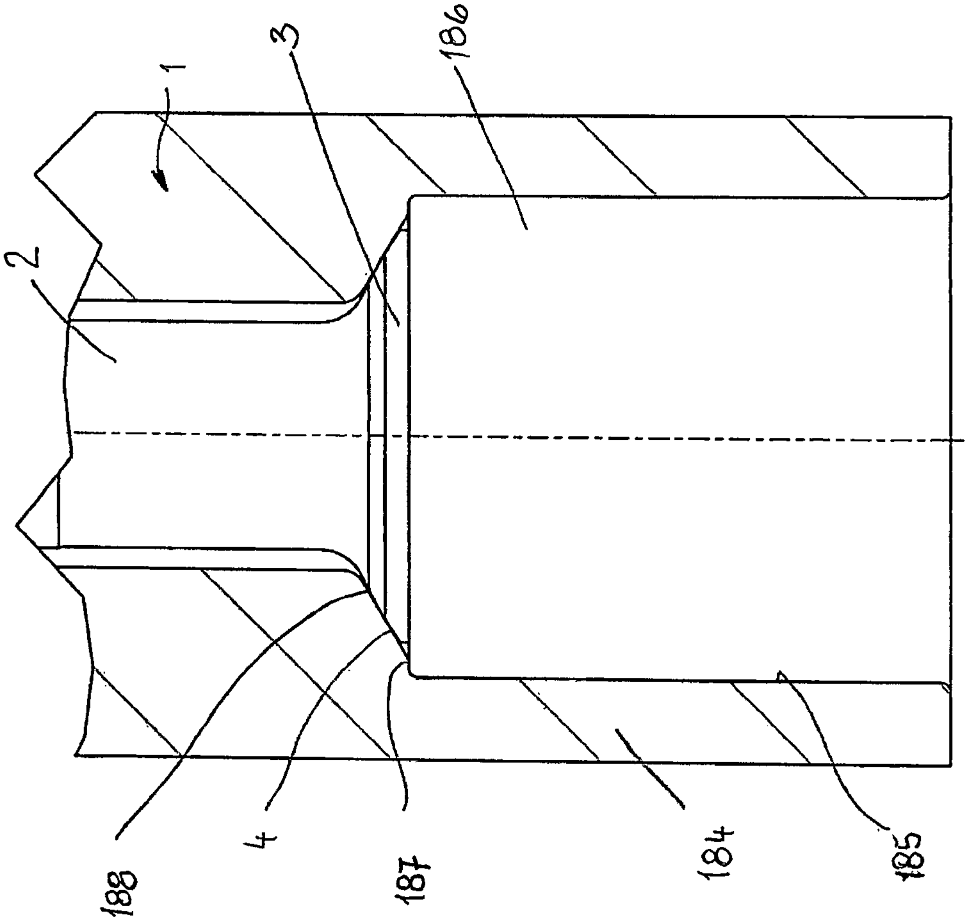
FIG. 43 shows, in enlarged representation and in section, a further embodiment of a nozzle of the gas injector.
Figure 44:
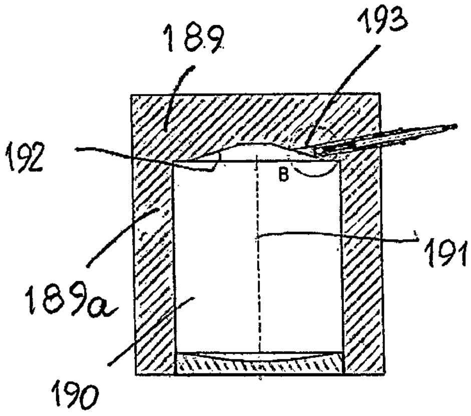
FIG. 44 shows, in section, a part of a cylinder of a combustion engine with a combustion chamber into which the gas is blown by means of the gas injector.

FIG. 43 shows the possibility of setting the guidance of the gas jet exiting the gas injector by shaping the housing 1 accordingly. The housing 1 of the gas injector is provided with a sleeve-shaped extension 184 adjacent to the nozzle opening 4. It is advantageously designed to be cylindrical and has an inner wall 185, the clear width of which is greater than the outer diameter of the valve plate 3. As such, it can be easily moved into the interior chamber 186 of the extension 184 bounded by the inner wall 185 when the gas injector is opened.

Advantageously, the inner wall 185 merges via a radial ring-shaped offset 187 into a conical wall 188 bounding the nozzle opening 4.

The extension 184 forms a jet guide for the gas exiting when the injector needle 2 is open, which gas is directed by the inner wall 185 before entering the combustion chamber of the internal combustion engine.

The length of the extension 184 depends on the desired jet shape in the combustion chamber. The extension 184 also has the advantage that the heat generated during use of the gas injector can be discharged well.

The extension 184 is advantageously designed in one piece with the housing 1.

FIGS. 44 to 54 show various possibilities in which the gas injector can be connected to a cylinder head 189 of a cylinder 189*a* of the internal combustion engine. For the sake of simplicity, the cylinder 189*a* and the cylinder head 189 are shown in one piece with one another. Of course, the cylinder head 189 is connected to the cylinder 189*a* in a sealed manner.

The cylinder 189*a* has a plurality of combustion chambers 190, each containing a piston (not shown). With the exemplary embodiments according to FIGS. 44 to 54, the gas is blown laterally into the combustion chamber 190. In deviation from the illustrated exemplary embodiments in accordance with FIGS. 44 to 54, the gas injector can also be connected to the cylinder head 189 parallel to the axis 191 of the combustion chamber 190. In such a case, the connection is effected eccentrically with respect to the combustion chamber axis 191.

The angular position of the gas injector with respect to the combustion chamber axis 191 is flexible, as long as the gas injector can be attached to the cylinder head 189 for feeding the gas into the combustion chamber 190.

The combustion chamber 190 is bounded at the upper end by a taper-shaped wall 192, into which an installation opening 193 for the gas injector opens. The axis of the installation opening 193 is located at an obtuse angle to the combustion chamber axis 191.

Figure 45:
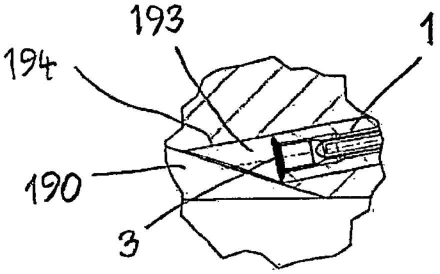
FIG. 45 shows the detail B in FIG. 44 in enlarged representation.

As FIG. 45 shows, the housing 1 of the gas injector is inserted into the installation opening 193 to such an extent that the valve plate 3 does not project into the combustion chamber 190 in the closed position. Due to the inclined position of the installation opening 193, the wall 194 of the installation opening 193 protrudes over part of its circumference beyond the valve plate 3. Such protruding cylindrical section of the installation opening 193 forms a cylindrical jet guide for the gas exiting the gas injector before it enters the combustion chamber 190 from the installation opening 193.

The housing 1 is suitably installed in a gas-tight manner in the installation opening 193. The installation opening 193 has a constant cross-section along its entire length.

Figure 46:
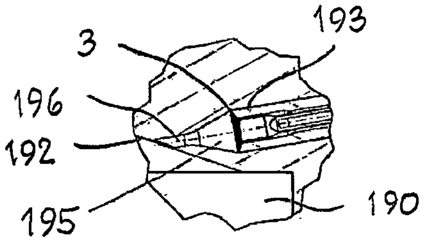
FIG. 46 shows, in a representation corresponding to FIG. 45, a further embodiment of an installation position of the injector needle of the gas injector.

With the embodiment in accordance with FIG. 46, the installation opening 193 adjacent to the valve seat has a conical region 195, which is adjoined to a cylindrical section 196 that is thin in diameter. It opens into the wall 192 of the combustion chamber 190. The tapered section 196 is coaxial with the longitudinal axis of the gas injector. The conical region 195 is designed such that the valve plate 3 of the gas injector can be easily adjusted to its open position if gas is to be introduced into the combustion chamber 190. The thin section 196 forms a jet guide for the gas that is accelerated in the thin section 196. This allows better mixing of the gas with the fresh air.

Figure 47:
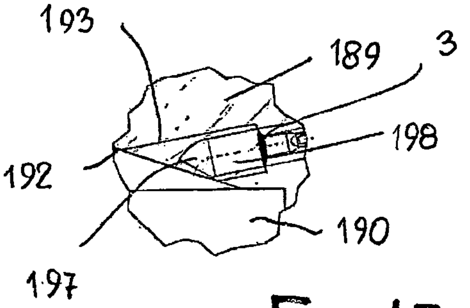
FIG. 47 shows, in a representation corresponding to FIG. 45, a further embodiment of a feed of the gas into the combustion chamber by means of the gas injector.

FIG. 47 shows the possibility of deflecting the gas exiting the gas injector via a cylindrical jet guide 197 before it enters the combustion chamber 190. The jet guide 197 opens into the wall 192 of the combustion chamber 190.

The gas is deflected through an angle greater than 90° with respect to the longitudinal axis of a cylindrical section 198, which is adjoined by the jet guide 197. Such deflection angle can be adapted to the installation conditions and/or to the type of gas to be blown in. The jet guide 197 can be formed via a correspondingly designed component that is inserted into the installation opening 193 in the cylinder head 189.

It is also possible to provide the jet guide 197 serving for deflection directly in the cylinder head 189 by means of a corresponding design of the installation opening 193.

The spring plate 3 dips into the cylindrical section 198 if it is displaced to its open position.

Figure 48:
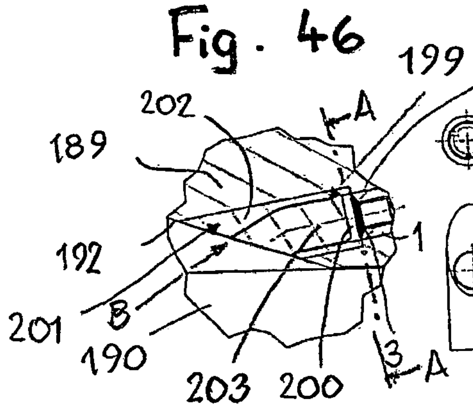
FIG. 48 shows, in a representation corresponding to FIG. 45, a further embodiment of a feed of a gas into the combustion chamber by means of the gas injector.
Figure 49:
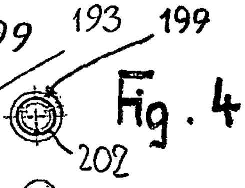
FIG. 49 shows a section along line A-A in FIG. 48.
Figure 50:
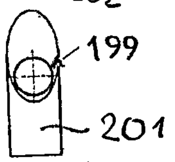
FIG. 50 shows a view in the direction of arrow B in FIG. 48.

With the exemplary embodiment according to FIGS. 48 to 50, a deflected blowing of the gas into the combustion chamber 190 takes place via a cylindrical gap-shaped jet guide 199 (thick lines in FIGS. 48 to 50). It can be formed by an independent component 201 that is inserted into the installation opening 193 of the cylinder head 189. However, the jet guide 199 can also be incorporated directly into the installation opening 193.

The gas injector is located immediately behind the jet guide 199, as viewed from the combustion chamber 190. When the gas injector opens, the gas flows past the valve plate 3 initially into a small distribution chamber 200, into which the cylindrical gap guide 199 opens.

As FIG. 48 shows, the jet guide 199 is designed to run initially in axial extension of the injector or its housing 1 and then angled in the direction of the wall 192 of the combustion chamber 190.

The distribution chamber 200 should be as small as possible. As a result, the component 201 has compact dimensions on the one hand, and on the other hand, this reliably guides the gas into the cylindrical jet guide 199. It extends along the length of the component 201 and is designed between a cylindrical outer part 202 and an inner part 203.

The gas exits the cylindrical jet guide 199 into the combustion chamber 190 in annular form.

Figure 51:
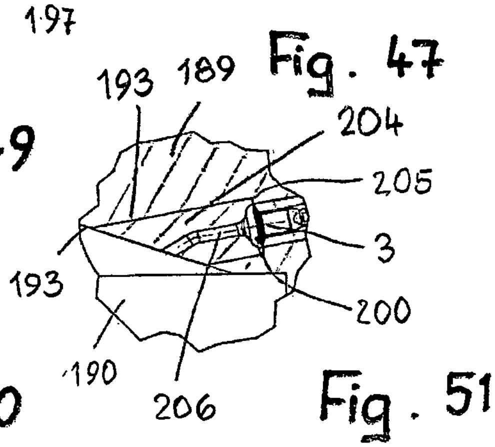
FIG. 51 shows, in a representation corresponding to FIG. 45, a further embodiment of a feed of the gas into the combustion chamber by means of the gas injector.

With the exemplary embodiment according to FIG. 51, a component 204 is inserted into the installation opening 193 of the cylinder head 189, which component has a cylindrical contour and is fastened in the installation opening 193 in a suitable manner. Advantageously, the component 204 rests against an annular shoulder 205 at its end facing away from the combustion chamber 190. It serves as a stop upon installation of the component 204 into the installation opening 193.

A thin jet guide 206, which is circular in cross-section and opens into the wall 193 of the combustion chamber 190, extends through the component 204. The jet guide 206 is initially coaxial with the axis of the gas injector and then angled to transition to an end section that opens into the wall 193.

The distribution chamber 200, into which the valve plate 3 of the gas injector projects in the open position, is located between the gas injector and the thin jet guide 206.

The gas is accelerated in the thin jet guide 206 after exiting the gas injector, which is advantageous for the subsequent combustion process in the combustion chamber 190.

Figure 52:
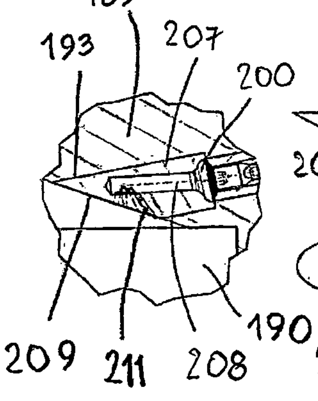
FIG. 52 shows, in a representation corresponding to FIG. 45, a further embodiment of the feed of the gas into the combustion chamber by means of the gas injector.
Figure 53:
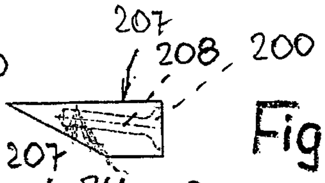
FIG. 53 shows, in enlarged representation, the outlet region of the gas from the injector needle.
Figure 54:
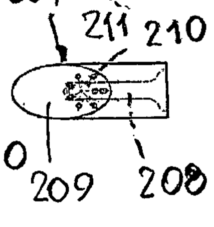
FIG. 54 shows a view of the outlet region in accordance with FIG. 53.

FIGS. 52 to 54 show a component 207, which is installed in the installation opening 193 of the cylinder head 189. In accordance with the previous embodiments, the component 207 is inserted into the installation opening 193 from the combustion chamber side and held in place in a suitable manner. A bore 208 is located in the component 207 and extends into the component 207 from the distribution chamber 200.

The bore 208 ends at a distance in front of the end face 209 of the component 207.

The nozzle openings 210 are located in the end face 209. By way of example, they are arranged on a circle at a distance from one another, as shown in particular in FIG. 44.

The nozzle openings 210 are connected to the bore 208 by the thin bores 211.

The bores 211 with the nozzle openings 210 ensure that the gas exiting the gas injector exits into the combustion chamber 190 in a fan shape. This enables good mixing of the gas with the fresh air in the combustion chamber 190.

Figure 55:
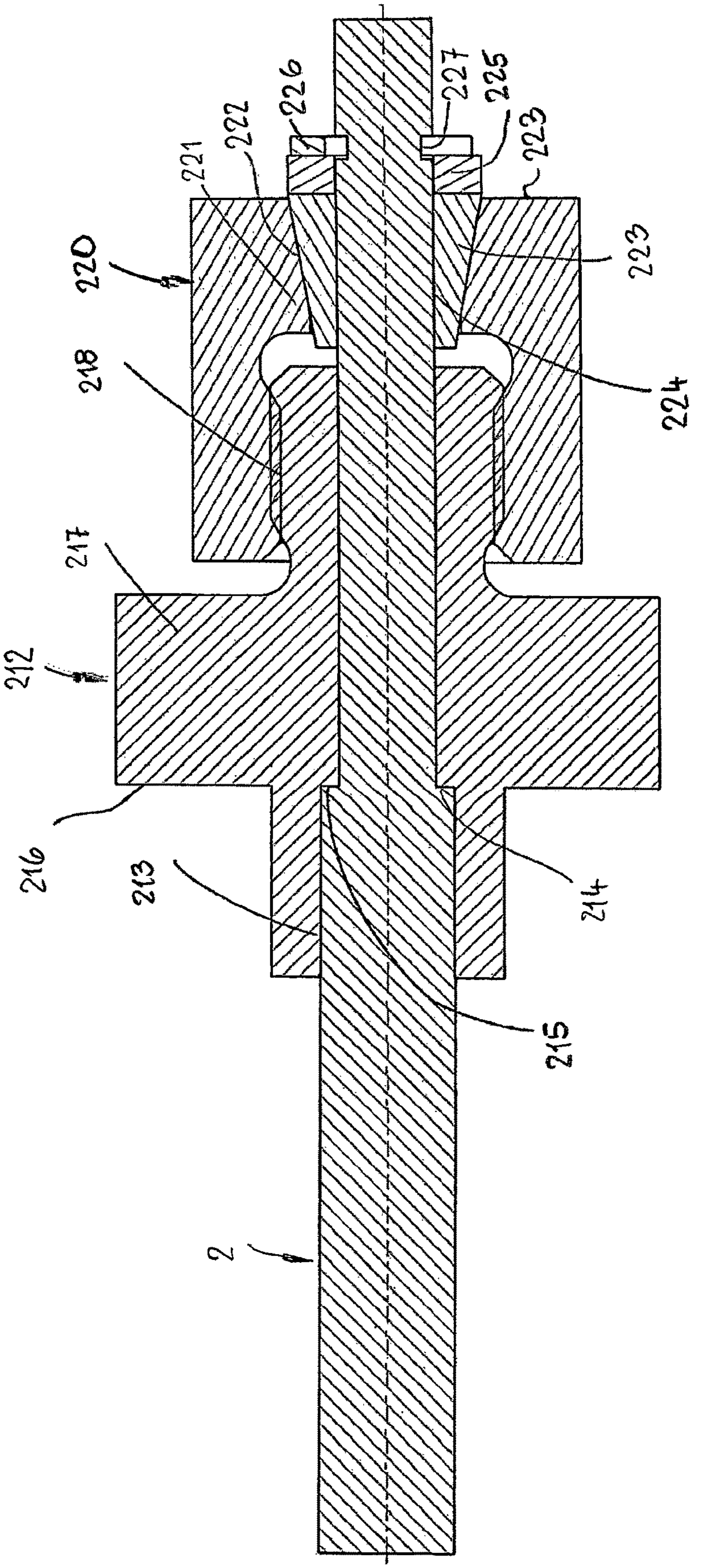
FIG. 55 shows, in section and simplified representation, a fastening of the injector needle.

FIG. 55 shows by way of example a simple fastening of the injector needle 2. It is shown only schematically.

The fastening device has a clamping screw 212 provided with a central through bore 213. The inner wall of the through opening 213 has a radial shoulder 214, against which the injector needle 2 comes into contact with a corresponding shoulder 215 in the installed position. In this manner, the injector needle 2 is secured axially in the clamping screw 212, which rests along its length against the outer side of the injector needle 2.

The clamping screw 212 is provided with a stop surface 216, with which it comes into contact with a corresponding mating surface in the injector housing 1 in the installed position. The stop surface 216 is provided on a radial flange 217 located approximately halfway along the length of the clamping screw 212.

At one end, the clamping screw 212 is provided with an external thread 218, which cooperates with an internal thread 219 of a nut 220.

The nut 220 is designed to be sleeve-shaped and has a base 221 at one end, which is provided with a central tapered opening 222. It tapers steadily from the outer side 223 of the base 221. The tapered opening 222 receives at least two collet chuck elements 223. They protrude with both ends from the tapered opening 222 and rest with tapered surfaces against the wall of the tapered opening 222.

The injector needle 2 projects through the collet chuck elements 223, which rest on and clamp the cylindrical outer side of the injector needle 2 with a cylindrical clamping surface 224.

The collet chuck elements 223 rest with their wider ends against a support disk 225, which is axially secured by a retaining ring 226. The retaining ring 226 engages an annular groove 227 in the outer side of the part of the injector needle 2 protruding over the nut 220.

The internal thread 219 is provided on the nut 220 such that the collet chuck elements 223 have a sufficient axial distance from the clamping screw 212 in the installation and clamping position.

If the clamping screw 212 is screwed into the nut 220, then the injector needle 2 is reliably clamped in the collet chuck elements 223 via the tapered surfaces of the collet chuck element 223 and tapered opening 222, which conical surfaces are in contact with one another. Corresponding rotation of the nut 220 pulls the collet chuck elements 223 into the tapered opening 222, causing them to be moved radially inward and clamp the injector needle 2.

The invention claimed is:

1. An injector for blowing a gas into a combustion chamber (190) or into an intake manifold of a combustion engine, comprising:

an injector housing (1) having
an inlet (63, 123) for the gas, and
an outlet opening (4); and an injector needle (2) by which the outlet opening (4) can be closed, and which can be adjusted in pressure-controlled fashion from a closed position to an open position, wherein the injector needle (2) is axially fixedly connected to a piston (26), wherein the at least one-piston (26) is under closing pressure in one direction, and under a valve-controlled control pressure in another direction, wherein the piston (26) can be actuated by the control pressure in order to adjust the injector needle (2) into the open position, wherein the piston (26) is provided in a pressure chamber (59), wherein the inlet (63, 123) is connected to a medium chamber (38; 54), wherein the medium chamber (38; 54) is separated from the pressure chamber (59) by a first valve (41, 61; 82, 83), wherein the first valve (41, 61; 82, 83) is actuable by an actuator, wherein the actuator includes a valve actuating piston (41), wherein the valve actuating piston (41) in a first position closes the access from the medium chamber (38; 54) to the pressure chamber (59), and wherein the valve actuating piston (41) cooperates with a second valve (35; 82; 81), and wherein the second valve (35; 82; 81),
in a first position of the valve actuating piston (41), is held in an open position and
is closed in a second position of the valve actuating piston (41), such that the control pressure prevails in the pressure chamber (59), whereby the first valve (41, 61; 82, 83) is opened, wherein the injector needle (2), the piston (26), the pressure chamber (59), the medium chamber (38; 54), the first valve (41, 61; 82, 83), the actuator, the valve actuating piston (41), and the second valve (35; 82; 81) are arranged in the injector housing (1).

2. An injector for blowing a gas into a combustion chamber (190) or into an intake manifold of a combustion engine, comprising:

an injector housing (1) having
an inlet (63, 123) for the gas, and
an outlet opening (4); and an injector needle (2) by which the outlet opening (4) can be closed and which can be adjusted in pressure-controlled fashion from a closed position to an open position, wherein the injector needle (2) is axially fixedly connected to at least one piston (26), wherein the at least one piston (26) is under closing pressure in one direction and can be displaced in another direction for adjusting the injector needle (2) into the open position, wherein the injector needle (2) has an axial bore (91), wherein the axial bore (91) is aligned with an axial bore (87) of an actuating piston (41), wherein a magnetic armature (43) is axially fixedly arranged on the actuating piston (41), wherein the axial bore (87) of the actuating piston (41) is connected to the inlet (123) for the gas, wherein the injector needle (2) is axially fixedly connected to a compensation piston (101), wherein the compensation piston (101) is provided at a side of the piston (26) facing the outlet opening (4), wherein the piston (26) has a sleeve-shaped guide part (31), wherein a check valve (133) is arranged in the sleeve-shaped guide part (31), wherein the check valve (133) closes a fluid path from the combustion chamber (190) to the axial bore (87) of the actuating piston (41), and wherein the actuating piston (41) is axially displaced by attracting the magnetic armature (43) such that the check valve (133) is opened and the injector needle (2) is displaced via the piston (26) and the compensation piston (101).

3. The injector according to claim 1, wherein the actuator (42) is not actuated in the first position of the valve actuating piston (41) and is actuated in the second position of the valve actuating piston (41).

4. The injector according to claim 1, wherein the injector needle (2) assumes its closed position when the first valve (35, 82) is closed.

5. The injector according to claim 1, wherein the second valve (81) is flow-connected to a pressure chamber (8, 59), and wherein the pressure chamber (8, 59) is bounded by the piston (26).

6. The injector according to claim 1, wherein the gas to be blown in is used to achieve the control pressure.

7. The injector according to claim 1, wherein the injector housing (1) or the injector needle (2) has at least one return line (66, 69, 91; 92, 95, 60) for a residual portion of the gas, and wherein at least one check valve (67, 177) is seated in the at least one return line (66, 69, 91; 92, 95, 60), and wherein the at least one check valve (67, 177) closes in the direction of the at least one return line (66).

8. The injector according to claim 7, wherein the return line (66, 69, 91; 92, 95, 60) is line-connected to the pressure chamber (59) when the first valve (35, 81, 82) is open.

9. The injector according to claim 1, wherein at least one bellows (25, 106) or at least one piston sealing ring (151, 152; 154, 155) is provided for sealing the injector needle (2).

10. The injector according to claim 1, wherein the valve actuating piston (41) is designed as a hollow piston and can be acted upon by a pressure medium.

11. The injector according to claim 1, wherein the actuator (42) is a magnetic drive.

12. The injector according to claim 1, wherein a switching leakage is fed into an intake manifold (150) or into a reservoir or into the combustion chamber.

13. The injector according to claim 1, wherein the injector needle (2) has a passage (91) for the gas to be blown in.

14. The injector according to claim 1, wherein a setting device (157, 160, 161; 156, 166; 2, 99, 166) is provided for setting a nozzle opening stroke.

15. The injector according to claim 14, wherein the setting device has at least one axially deformable setting element (160, 161, 166).

16. The injector according to claim 15, wherein the setting element (160, 161, 166) is an elastically or plastically deformable disc.

17. The injector according to claim 1, wherein the outlet opening (4) or the injector needle (2) or an installation opening (193) directly in a cylinder head (189) has at least one gas guide region (146, 149, 184, 195, 196, 197, 199, 206) for achieving a desired blowing-in depth and/or a desired blowing-in pattern of the gas.

18. The injector according to claim 1, wherein characteristic features of the injector are stored in a barcode.

19. The injector according to claim 1, wherein the injector needle (2), at least in a region of a valve seat (3, 4), and/or the valve seat (3, 4) is provided with a coating (178, 179) as wear protection.

20. The injector according to claim 1, wherein the injector needle (2) is clamped with at least one wedge element (223).

* * * * *